United States Patent
Lim et al.

(10) Patent No.: US 10,692,274 B2
(45) Date of Patent: Jun. 23, 2020

(54) IMAGE PROCESSING APPARATUS AND METHOD

(71) Applicant: Samsung Electronics Co., Ltd., Gyeonggi-do (KR)

(72) Inventors: Jin-Ho Lim, Gyeonggi-do (KR); In-Su Yu, Seoul (KR); Il-Hoe Jung, Seoul (KR); Byung-Po Choi, Gyeonggi-do (KR); Sang-Won Chae, Seoul (KR); Jung-Eun Lee, Gyeonggi-do (KR); Cheol-Ho Cheong, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/623,057

(22) Filed: Jun. 14, 2017

(65) Prior Publication Data

US 2017/0358126 A1    Dec. 14, 2017

(30) Foreign Application Priority Data

Jun. 14, 2016  (KR) .................. 10-2016-0074111

(51) Int. Cl.
| | | |
|---|---|---|
| G06T 15/20 | (2011.01) | |
| G06T 3/00 | (2006.01) | |
| H04N 13/178 | (2018.01) | |
| H04N 13/243 | (2018.01) | |
| H04N 13/232 | (2018.01) | |

(Continued)

(52) U.S. Cl.
CPC .......... *G06T 15/205* (2013.01); *G06T 3/0018* (2013.01); *G06T 3/0062* (2013.01); *G06T 9/001* (2013.01); *G06T 17/20* (2013.01); *G06T 19/20* (2013.01); *H04N 13/161* (2018.05); *H04N 13/178* (2018.05); *H04N 13/232* (2018.05);

(Continued)

(58) Field of Classification Search
USPC ....................................................... 345/420
See application file for complete search history.

(56) References Cited

U.S. PATENT DOCUMENTS

| | | |
|---|---|---|
| 5,923,334 A | 7/1999 | Luken |
| 8,817,067 B1 | 8/2014 | Fan et al. |

(Continued)

FOREIGN PATENT DOCUMENTS

| | | |
|---|---|---|
| EP | 3 419 301 | 12/2018 |
| JP | 2004-187298 | 7/2004 |

OTHER PUBLICATIONS

International Search Report dated Sep. 14, 2017 issued in counterpart application No. PCT/KR2017/006204, 9 pages.

(Continued)

*Primary Examiner* — Yingchun He
(74) *Attorney, Agent, or Firm* — The Farrell Law Firm, P.C.

(57) ABSTRACT

An image processing method and apparatus are provided. The image processing apparatus includes an interface configured to output an input frame and metadata including type information and subtype information; and a rendering unit configured to: determine a type of a polyhedron included in an output frame based on the type information, determine attributes of arrangement of a plurality of areas included in the input frame based on the subtype information, and render the output frame by mapping each of the plurality of areas to corresponding faces of the polyhedron, based on the attributes of arrangement of the plurality of areas.

20 Claims, 31 Drawing Sheets

(51) Int. Cl.
*H04N 13/161* (2018.01)
*G06T 17/20* (2006.01)
*G06T 19/20* (2011.01)
*G06T 9/00* (2006.01)

(52) U.S. Cl.
CPC ....... *H04N 13/243* (2018.05); *G06T 2215/16* (2013.01); *G06T 2219/2004* (2013.01)

(56) References Cited

U.S. PATENT DOCUMENTS

| | | |
|---|---|---|
| 2004/0105597 A1 | 6/2004 | Lelescu et al. |
| 2009/0063419 A1* | 3/2009 | Nurminen ................ G06F 16/78 |
| 2009/0123088 A1 | 5/2009 | Kallay et al. |
| 2010/0001997 A1* | 1/2010 | Kajikawa ................ G06T 17/20 |
| | | 345/419 |
| 2011/0254915 A1 | 10/2011 | Vincent et al. |
| 2012/0275725 A1* | 11/2012 | Kelly .................... G06T 3/0018 |
| | | 382/300 |
| 2014/0132598 A1 | 5/2014 | Narukawa |
| 2016/0112704 A1 | 4/2016 | Grange et al. |
| 2016/0112713 A1 | 4/2016 | Russell |
| 2017/0018121 A1* | 1/2017 | Lawson ................ G06T 3/0093 |
| 2017/0251208 A1* | 8/2017 | Adsumilli ................ G06T 3/20 |
| 2017/0339392 A1* | 11/2017 | Forutanpour ........ H04N 13/161 |
| 2018/0144547 A1* | 5/2018 | Shakib .................. G06T 19/003 |
| 2018/0359487 A1* | 12/2018 | Bang ..................... H04N 19/50 |

OTHER PUBLICATIONS

Thomas Engelhardt, et al. "Octahedron Environment Maps", Visualization Reseach Center, Univeristy of Stuttgart, VMV 2008.
European Search Report dated Mar. 7, 2019 issued in counterpart application No. 17813586.9-1208, 8 pages.

* cited by examiner

[SPHERICAL COORDINATES]    [FISHEYE COORDINATES]    [FISHEYE IMAGE]

| SUBTYPE : 17 | |
|---|---|
| INPUT FRAME | OUTPUT FRAME |
| a | 1 |
| c | 2 |
| e | 3 |
| g | 4 |
| h | 5 |
| i | 6 |
| l | 7 |
| n | 8 |

```
Geometry Information
v1   v1.x   v1.y   v1.z
v2   v2.x   v2.y   v2.z
v3   v3.x   v3.y   v3.z
                       ......

```
# 7 vertex positions
v   0.0    100.0      0.0 #1
v   0.0      0.0    100.0 #2
v -100.0     0.0      0.0 #3
v   0.0      0.0   -100.0 #4
v 100.0      0.0      0.0 #5
v   0.0   -100.0      0.0 #6
v  50.0      0.0     50.0 #7
# 25 UV coordinates
vt 0.125 0.0 #1
vt 0.375 0.0 #2
vt 0.625 0.0 #3
vt 0.875 0.0 #4
vt 0.00 1.0 #5
vt 0.25 1.0 #6
vt 0.50 1.0 #7
vt 0.75 1.0 #8
vt 1.000 1.0 #9
vt 0.125 0.0 #10
vt 0.375 0.0 #11
vt 0.625 0.0 #12
vt 0.875 0.0 #13
vt 0.875 1.0 #14
vt 1.0   0.0 #15
vt 0.0   0.0 #16
vt 0.125 0.0 #17
vt 0.375 0.0 #18
vt 0.625 0.0 #19
vt 0.875 0.0 #20
vt 0.00 1.0 #21
vt 0.25 1.0 #22
vt 0.50 1.0 #23
vt 0.75 1.0 #24
vt 1.000 1.0 #25
# Mesh " with 9 faces
f 1/31 2/5  3/6
f 1/2  3/6  4/7
f 1/3  4/7  5/8
f 1/4  5/8  2/9
f 2/317 6/22 3/318
f 3/318 6/23 4/319
f 4/319 6/24 5/20
f 5/20  6/25 7/315
f 7/316 6/21 2/317
```

FIG.19D

IMAGE PROCESSING APPARATUS AND METHOD

PRIORITY

This application claims priority under 35 U.S.C. § 119(a) to Korean Application Serial No. 10-2016-0074111, which was filed in the Korean Intellectual Property Office on Jun. 14, 2016, the entire content of which is incorporated herein by reference.

BACKGROUND

1. Field of the Disclosure

Various embodiments of the present disclosure relate to an image processing apparatus and an image processing method thereof and, more particularly, to an image processing apparatus for rendering an image and an image processing method thereof.

2. Description of the Related Art

An omnidirectional image camera system refers is capable of photographing a 360-degree omnidirectional image with reference to a fixed viewpoint. The omnidirectional image includes a view from a user's perspective while rotating in place and while looking up and down.

The omnidirectional image camera system may be equipped with a special type of mirror, e.g., a hyperboloid mirror, and/or a special lens, e.g., a fisheye lens, and/or may use multiple cameras to photograph the omnidirectional image.

Currently, schemes are being researched for more efficiently compressing an omnidirectional image using a conventional video codec, such as MPEG-4 or H.264. A typical method reduces the data amount of a compressed image by mapping an omnidirectional image to another two-dimensional plane image. Examples of such an omnidirectional image mapping method include a Cartographical Projection method and a Polygonal Projection method, which perform a two-dimensional plane mapping by considering a camera property, such as a calibration parameter.

However, because an omnidirectional image is an image photographed in all directions and has a very large file size, the above-described compression method alone cannot sufficiently solve the overload of a system for transmitting or receiving the image (e.g., an excessive use of bandwidth resources, and the increase of image processing speed).

In addition, distortion occurs when mapping an image of a three-dimensional space included in an omnidirectional image to a two-dimensional plane image.

Accordingly, a need exists for a compression method that minimizes a file size and distortion of the omnidirectional image while maintaining a quality of service (QoS) of the omnidirectional image from a user's point of view.

SUMMARY

The present disclosure has been made to address the above-mentioned requirements, and to provide at least some of the advantages described below.

Accordingly, an aspect of the present disclosure is to provide an image processing apparatus and method, which reduce distortion of an image and minimize the use of bandwidth resources in processing an omnidirectional image.

In accordance with an aspect of the present disclosure, an image processing apparatus is provided. The image processing apparatus includes an interface configured to output an input frame and metadata including type information and subtype information; and a rendering unit configured to: determine a type of a polyhedron included in an output frame based on the type information, determine attributes of arrangement of a plurality of areas included in the input frame based on the subtype information, and render the output frame by mapping each of the plurality of areas to corresponding faces of the polyhedron, based on the attributes of arrangement of the plurality of areas.

In accordance another aspect of the present disclosure, an image processing apparatus is provided. The image processing apparatus includes a storage unit configured to store an input frame; and a transcoder configured to: generate metadata including type information and subtype information, generate an output frame based on the input frame, the type information, and the subtype information, store the metadata and the output frame in the storage unit, determine a type of a polyhedron included in the input frame based on the type information, determine attributes of arrangement of a plurality of areas included in the output frame based on the subtype information, and map the input frame to the output frame based on the type of the polyhedron and the attributes of arrangement of the plurality of areas.

In accordance with another aspect of the present disclosure, an image processing method is provided. The image processing method includes determining a type of a polyhedron included in an output frame based on type information included in metadata; determining attributes of arrangement of a plurality of areas included in an input frame based on subtype information included in the metadata; and rendering the output frame by mapping each of the plurality of areas to corresponding faces of the polyhedron, based on the attributes of arrangement of the plurality of areas.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIGS. 19A to 19D illustrate a rendering method according to an embodiment of the present disclosure;

DETAILED DESCRIPTION

Figure 1:
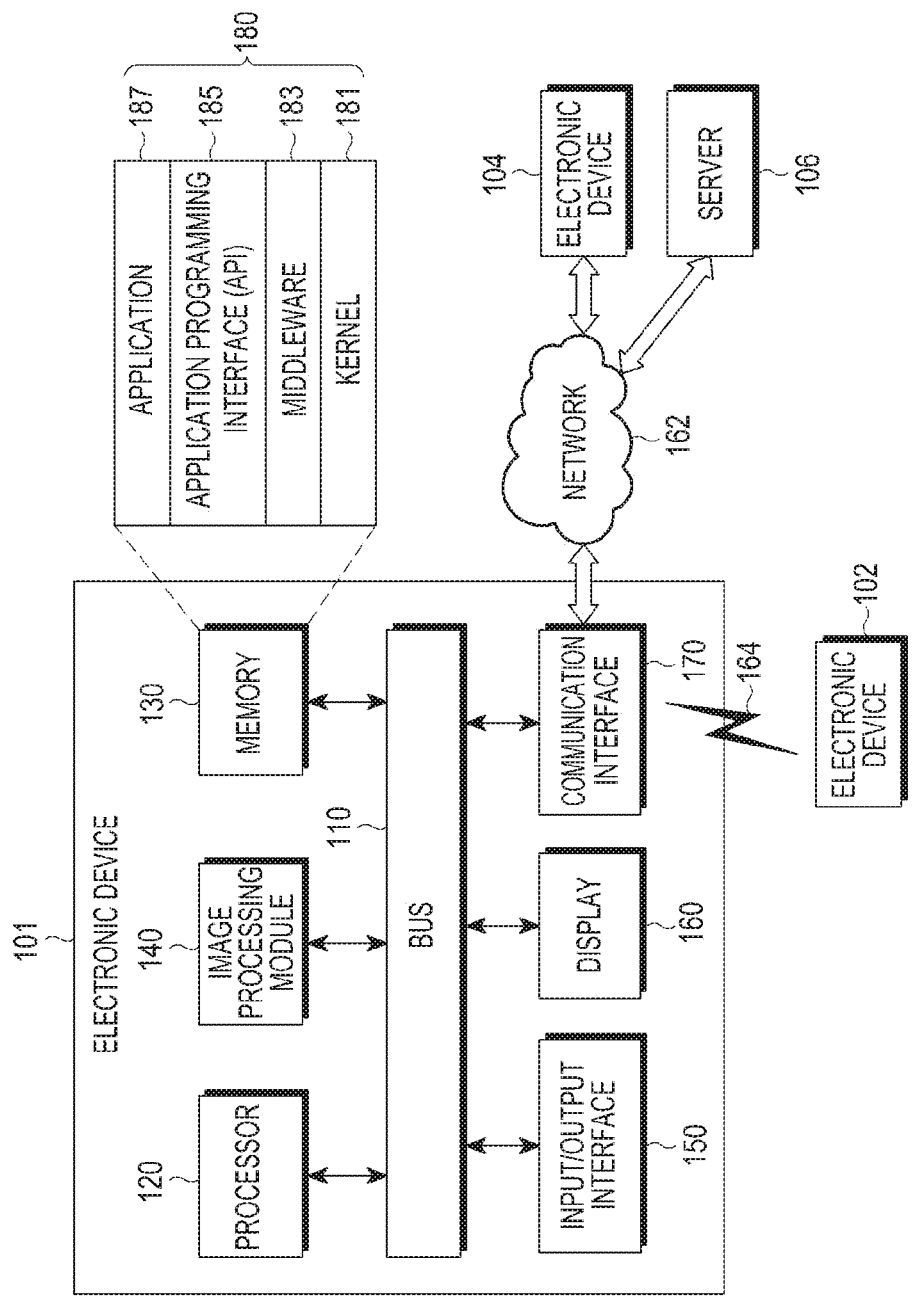
FIG. 1 illustrates a network environment according to an embodiment of the present disclosure.

Hereinafter, various embodiments of the present disclosure will be described with reference to the accompanying drawings. However, there is no intent to limit the present disclosure to the particular forms disclosed herein; rather, the present disclosure should be construed to cover various modifications, equivalents, and/or alternatives of embodiments of the present disclosure.

In describing the drawings, similar reference numerals may be used to designate similar constituent elements.

The terms and expressions used in the present disclosure are used to describe specific embodiments, and are not intended to limit the present disclosure. Accordingly, a singular expression may include a plural expression unless they are definitely different within the context.

Unless defined otherwise, all terms used herein, including technical and scientific terms, have the same meanings as those commonly understood by a person of ordinary skilled in the art to which the present disclosure pertains. Terms, such as those defined in a generally used dictionary, may be interpreted to have the same meanings as their contextual meanings in the relevant field of art, and are not to be interpreted to have ideal or excessively formal meanings unless clearly defined as such in the present disclosure. In some cases, even terms defined in the present disclosure should not be interpreted to exclude embodiments of the present disclosure.

Herein, the expressions "have", "may have", "include", and "may include" refer to the existence of a corresponding feature (e.g., a numeral, a function, an operation, or a constituent element such as a component), and do not exclude one or more additional features.

The expressions "A or B", "at least one of A or/and B", and "one or more of A or/and B" may include all possible combinations of the items listed. For example, these expressions may include (1) at least one A, (2) at least one B, or (3) both at least one A and at least one B.

The expressions "a first", "a second", "the first", and "the second" may modify various components regardless of an order and/or importance the components but do not limit the corresponding components. For example, a first user device and a second user device indicate different user devices, although both are user devices. For example, a first element may be referred to as a second element, and similarly, a second element may be referred to as a first element without departing from the scope of the present disclosure.

When an element (e.g., a first element) is referred to as being (operatively or communicatively) "connected," or "coupled," to another element (e.g., a second element), the first element may be directly connected or coupled directly to the second element or another element (e.g., a third element) may be interposed there between. In contrast, when the first element is referred to as being "directly connected," or "directly coupled" to the second element, no elements are interposed there between.

The expression "configured to" may be interchangeably used with the expression "suitable for", "having the capability to", "designed to", "adapted to", "made to", or "capable of". The expression "configured to" does not necessarily imply "specifically designed to" in hardware. For example, in some situations, the expression "a device configured to" may indicate that the device, together with other devices or components, "is able to". As another example, the phrase "processor adapted (or configured) to perform A, B, and C" may indicate a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

An electronic device according to an embodiment of the present disclosure may include a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. For example, the wearable device may include an accessory type device (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

An electronic device may be a home appliance, such as a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

An electronic device may include a medical device (e.g., a portable medical measuring device, such as a blood glucose monitoring device, a heart rate monitoring device, a blood pressure measuring device, a body temperature measuring device, etc.), a Magnetic Resonance Angiography (MRA) device, a Magnetic Resonance Imaging (MRI) device, a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship, and a gyro-compass), avionics, a security device, an automotive head unit, a robot for home or industry, an automatic teller machine (ATM), a point of sales (POS) device, or an Internet of things (IoT) device (e.g., a light bulb, a sensor, electric or gas meter, a sprinkler device, a fire alarm, a thermostat, a streetlamp, a toaster, a sporting goods, a hot water tank, a heater, a boiler, etc.).

An electronic device may also include at least one of a part of furniture or a building/structure, an electronic board, an electronic signature receiving device, a projector, and various kinds of measuring instruments (e.g., a water meter, an electric meter, a gas meter, and a radio wave meter).

An electronic device may also be a flexible device.

An electronic device may be a combination of two or more of the aforementioned devices.

Of course, an electronic device according to an embodiment of the present disclosure is not limited to the above-mentioned devices, and may include a new electronic device according to the development of new technologies.

Herein, the term "user" may refer to a person who uses an electronic device or an apparatus (e.g., an artificial intelligence electronic device) using an electronic device.

FIG. 1 illustrates a network environment according to an embodiment of the present disclosure.

Referring to FIG. 1, an electronic device 101 includes a bus 110, a processor 120, a memory 130, an image processing module 140, an input/output interface 150, a display 160, and a communication interface 170. Alternatively, the electronic device 101 may omit at least one of the above elements or may further include other elements.

The bus 110 may include a circuit that interconnects the components 120 to 170 and delivers a communication signal (e.g., a control message and/or data) between the components 120 to 170.

The processor 120 may include one or more of a CPU, an AP, a communication processor (CP), or an image signal processor (ISP). For example, the processor 120 may perform control, image signal processing, and/or data processing or operation relating to the communication of at least one other element of the electronic device 101.

When the ISP is included in the processor 120, the processor 120 may acquire an omnidirectional image. The processor 120 may map the omnidirectional image to a two-dimensional image using, e.g., an OHP method. The processor 120 may generate metadata using coordinates values when an omnidirectional image is mapped to a two-dimensional image. The processor 120 may map an omnidirectional image to each face of an octahedron, and map each face of the octahedron to which the omnidirectional image is mapped to a two-dimensional image. The processor 120 may match the coordinates of the vertices of the respective faces of the octahedron and the vertex coordinates of the mapped two-dimensional image, and may generate metadata based on the information.

Although the omnidirectional image is described as being mapped to the octahedron herein, the matching object of the omnidirectional image is not limited to the octahedron. For example, the processor 120 may map an omnidirectional image to an octahedron, and then map each face of the mapped octahedron to a two-dimensional image. In this case, each face of the octahedron may be an isosceles triangle or a triangle having no pair of equilateral sides (in which a pair of equal sides does not exist). As another example, the processor 120 may map an omnidirectional image to each face of a polyhedron with 16 faces, and map some of the areas included in the faces of the mapped polyhedron with 16 faces to a two-dimensional image. The processor 120 may match each vertex of the octahedron or the polyhedron with 16 faces and each vertex of the two-dimensional image, and generate metadata based on the information.

The processor 120 may transmit the mapped two-dimensional image and metadata to other configurations or other external apparatus through the communication interface 170 or the input/output interface 150. Alternatively, the processor 120 may store at least one of the mapped two-dimensional image and the metadata in the memory 130.

The processor 120 may perform rendering based on the two-dimensional image and metadata to which the omnidirectional image is mapped. The processor 120 may receive the mapped two-dimensional image and metadata from other configurations through the input/output interface 150, and receive the mapped two-dimensional image and metadata from the external device through the communication interface 170.

The processor 120 may perform rendering using the mapped two-dimensional image. Specifically, the processor 120 may determine the type of a polyhedron included in an output frame to be rendered based on type information included in metadata. The processor 120 may render the mapped two-dimensional image based on subtype information included in metadata as an output frame.

The processor 120 may map a plurality of areas included in the mapped two-dimensional image to each face of a polyhedron included in the output frame to perform rendering. In this case, the processor 120 may determine positions and directions in which a plurality of areas included in the mapped two-dimensional image are mapped to respective faces of the polyhedron included in the output frame based on the matching information included in the metadata, and map the plurality of areas to respective faces of the polyhedron included in the output frame based on the determined position and direction.

When performing the above-described rendering, the processor 120 may consider the direction of a user's line of sight. The processor 120 may determine a field of view (FOV) based on the direction of the user's line of sight, and render an area corresponding to the FOV as an output frame. The processor 120 may determine some areas of the mapped two-dimensional image corresponding to the FOV, based on the FOV. In this case, the processor 120 may map the determined some areas to each face of the polyhedron, and perform rendering thereof.

The memory 130 may include a volatile and/or non-volatile memory. The memory 130 may store instructions or data relevant to at least one other element of the electronic device 101. The memory 130 may store software and/or a program 180. The program 180 includes a kernel 181, middleware 183, an application programming interface (API) 185, and application programs (or "applications") 187. At least one of the kernel 181, the middleware 183, and the API 185 may be referred to as an operating system (OS).

The memory 130 may store metadata and/or compressed or uncompressed image data in an area designated by the processor 120. For example, the memory 130 may store metadata as at least a part of a target image.

The memory 130 may read the image (i.e., a two-dimensional image to which an omnidirectional image is mapped) and/or metadata, stored in the designated area, in response to the request of the processor 120, and provide the same to the processor 120.

The electronic device 101 may separately include an image processing module 140 when the processor 120 does not include an ISP. In this case, the image processing module 140 may perform the operations by the processor 120 instead of the processor 120.

Although FIG. 1 illustrates the image processing module 140 independent of the processor 120 and the memory 130, the present disclosure is not limited thereto. The image processing module 140 may be integrated with the processor 120, or may be stored in the memory in a software form, and thus, may be embodied in a form that may be executed in the processor 120. In addition, the image processing module 140 may be implemented in the processor 120 and the memory 130 in a distributed manner. In this case, the image processing module 140 may perform an operation of generating metadata and the processor 120 may perform mapping of an omnidirectional image to a two-dimensional image.

The kernel 181 may control or manage the system resources (e.g., the bus 110, the processor 120, the memory 130, etc.) that are used to execute operations or functions implemented in the other programs (e.g., the middleware 183, the API 185, and the applications 187. The kernel 181 may provide an interface through which the middleware 183, the API 185, or the applications 187 may access the individual elements of the electronic device 101 to control or manage the system resources.

The middleware 183 may function as an intermediary for allowing the API 185 or the applications 187 to communicate with the kernel 181 to exchange data.

The middleware 183 may also process one or more task requests, which are received from the applications 187, according to priorities thereof. For example, the middleware 183 may assign priorities for using the system resources (e.g., the bus 110, the processor 120, the memory 130, etc.) of the electronic device 101 to one or more of the applications 187. The middleware 183 may process one or more task requests according to the priority assigned to at least one application program, in order to perform scheduling or load balancing on the one or more task requests.

The API 185, which is an interface through which the applications 187 control functions provided from the kernel 181 or the middleware 183, may include at least one interface or function (e.g., instruction) for file control, window control, image processing, text control, etc.

The input/output interface 150 may function as an interface that can forward instructions or data, which are input from a user or an external device, to the other element(s) of the electronic device 101. The input/output interface 150 may output instructions or data, which are received from the other element(s) of the electronic device 101, to the user or the external device. For example, the input/output interface 150 may include a plurality of image sensors having different characteristics. The input/output interface 150 may transmit images photographed by a plurality of image sensors to the image processing module 140, the memory 130, the display 160, the communication interface 170, etc., through the bus 110. The photographed images may have different image characteristics due to differences in characteristics of the image sensor, conditions set for photographing, etc.

Examples of the display 160 may include a liquid crystal display (LCD), a light-emitting diode (LED) display, an organic LED (OLED) display, a micro electromechanical systems (MEMS) display, and/or an electronic paper display. The display 160 may display a rendered output frame or display a preview image.

The communication interface 170 may configure communication between the electronic device 101 and a first external electronic device 102, a second external electronic device 104, and/or a server 106. The communication interface 170 may be connected to a network 162 through wireless or wired communication to communicate with the second external electronic device 104 and/or the server 106.

The wireless communication may use, for example, at least one of long term evolution (LTE), LTE-Advance (LTE-A), code division multiple access (CDMA), wideband CDMA (WCDMA), universal mobile telecommunications system (UMTS), WiBro (Wireless Broadband), global system for mobile communications (GSM), etc., as a cellular communication protocol. In addition, the wireless communication includes short range communication 164. The short range communication 164 may include Wi-Fi, Bluetooth, near field communication (NFC), magnetic stripe transmission (MST), ZigBee, etc. The wireless communication may use a global positioning system (GPS) or a global navigation satellite system (GNSS).

The wired communication may include a universal serial bus (USB), a high definition multimedia interface (HDMI), recommended standard 232 (RS-232), and a plain old telephone service (POTS).

The network 162 may include at least one of a communication network, such as a computer network (e.g., a local area network (LAN) or a wide area network (WAN)), the Internet, and a telephone network.

Each of the first and second external electronic devices 102 and 104 may be of a type identical to or different from that of the electronic device 101.

The server 106 may include a group of one or more servers.

All or some of the operations performed in the electronic device 101 may be performed in the electronic devices 102 and 104 and/or the server 106. For example, when the electronic device 101 has to perform some functions or services, automatically or in response to a request, the electronic device 101 may request the electronic device 102 or 104 and/or the server 106 to perform at least some functions relating thereto instead of, or in addition to, performing the functions or services by itself. The electronic device 102 or 104 and/or the server 106 may perform the requested functions or the additional functions and may transfer the execution result to the electronic device 101. The electronic device 101 may provide the received result as it is, or may additionally process the received result to provide the requested functions or services. To this end, cloud computing, distributed computing, or client-server computing technology may be used.

Figure 2:
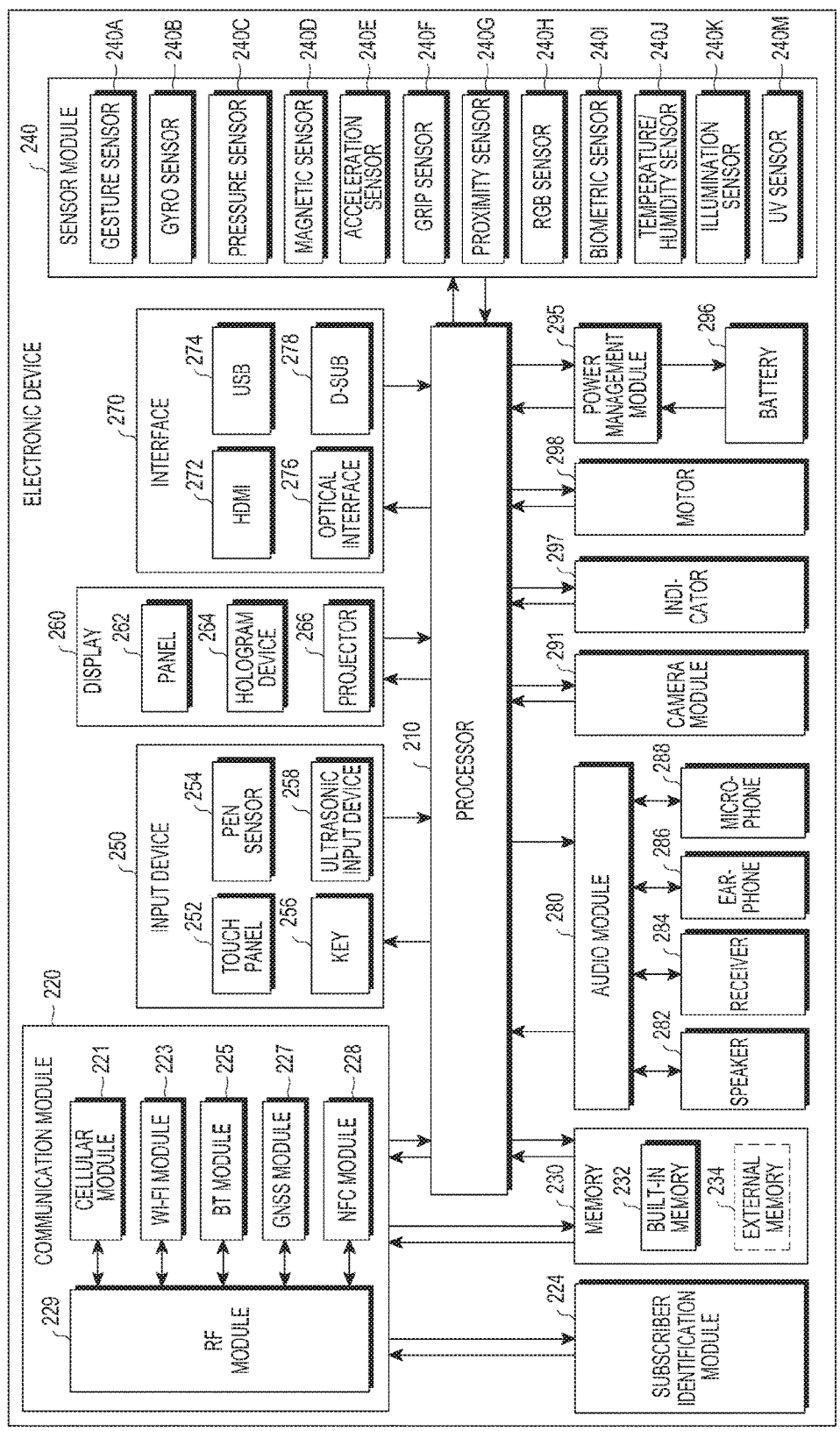
FIG. 2 illustrates an electronic device according to an embodiment of the present disclosure.

FIG. 2 illustrates an electronic device according to an embodiment of the present disclosure.

Referring to FIG. 2, the electronic device includes a processor 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may be embodied as a system on chip (SoC). The processor 210 may include a graphic processing unit (GPU) and/or an ISP. The processor 210 may also include at least some of the other elements illustrated in FIG. 2 (e.g., a cellular module 221). The processor 210 may load, into a volatile memory, instructions or data received from at least one (e.g., a non-volatile memory) of the other elements and process the same, and may store various pieces of data in a non-volatile memory.

The processor 210 may be configured such that all of the operations performed by the processor 120 and/or the image processing module 140, described with reference to FIG. 1, are performed.

The communication module 220 includes the cellular module 221, a Wi-Fi module 223, a BT module 225, a GNSS module 227, an NFC module 228, and a radio frequency (RF) module 229.

The cellular module 221 may provide a voice call, a video call, a text message service, an Internet service, etc., through a communication network. The cellular module 221 may identify or authenticate an electronic device in the communication network by using the SIM 224. The cellular module 221 may perform at least some of the functions that the processor 210 may provide. The cellular module 221 may also include a CP.

Each of the Wi-Fi module 223, the BT module 225, the GNSS module 227, and the NFC module 228 may include a processor for processing data transmitted/received through the corresponding module. At least two of the cellular module 221, the Wi-Fi module 223, the Bluetooth module 225, the GNSS module 227, and the NFC module 228 may be included in a single integrated chip (IC) or IC package.

The RF module 229 may transmit/receive a communication signal (e.g., an RF signal). The RF module 229 may include a transceiver, a power amplifier module (PAM), a frequency filter, a low noise amplifier (LNA), an antenna, etc. At least one of the cellular module 221, the Wi-Fi module 223, the Bluetooth module 225, the GNSS module 227, and the NFC module 228 may transmit/receive an RF signal through a separate RF module.

The communication module 220 may be configured such that the operations performed by the communication interface 170 in FIG. 1 can be performed therein. That is, the communication module 220 may make a request for compression of a target image to an external electronic device in response to the control from the processor 210. To this end, the communication module 220 may provide a target image (e.g., a two-dimensional image to which an omnidirectional image is mapped) and/or metadata corresponding to the target image to the external electronic device. The communication module 220 may receive a compressed image provided from the external electronic device, and transmit the received compressed image to the processor 210.

The SIM 224 may include a card and/or an embedded SIM, and may contain unique identification information (e.g., an integrated circuit card identifier (ICCID)) or subscriber information (e.g., an international mobile subscriber identity (IMSI)).

The memory 230 includes an internal memory 232 and an external memory 234. The memory 230 may record, in a designated area, a target image and/or metadata corresponding to the target image in response to the control of the processor 210. The memory 230 may read a specific target image and/or metadata corresponding to the specific target image in response to the control of the processor 210, and provide the read specific target image and/or metadata corresponding to the specific target image to the processor 210.

The internal memory 232 may include a volatile memory (e.g., a dynamic random access memory (DRAM), a static RAM (SRAM), a synchronous DRAM (SDRAM), etc.) and a non-volatile memory (e.g., a onetime programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.), a hard disc drive, a solid state drive (SSD), etc.).

The external memory 234 may further include a flash drive, a compact flash (CF), a secure digital (SD), a micro secure digital (Micro-SD), a mini secure digital (Mini-SD), an extreme digital (xD), a multi-media card (MMC), a memory stick, etc. The external memory 234 may be functionally and/or physically connected to the electronic device through various interfaces.

The sensor module 240 may measure a physical quantity or detect the operating state of the electronic device, and may convert the measured or detected information into an electrical signal. The sensor module 240 includes a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and a ultraviolet (UV) sensor 240M. Additionally or alternatively, the sensor module 240A may include an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. The electronic device may further include a processor, which is configured to control the sensor module 240, as a part of the processor 210 or separately from the processor 210 in order to control the sensor module 240 while the processor 210 is in a sleep state.

The input device 250 includes a touch panel 252, a (digital) pen sensor 254, a key 256, and an ultrasonic input unit 258. The touch panel 252 may use at least one of a capacitive type, a resistive type, an infrared type, and an ultrasonic type. The touch panel 252 may further include a control circuit. The touch panel 252 may further include a tactile layer and may provide a tactile response to the user.

The (digital) pen sensor 254 may include a recognition sheet which is a part of the touch panel or is separated from the touch panel.

The key 256 may include a physical button, an optical key, or a keypad.

The ultrasonic input device 258 may detect ultrasonic waves, which are generated by an input tool, through a microphone 288 and may identify data corresponding to the detected ultrasonic waves.

The display 260 includes a panel 262, a hologram device 264, and a projector 266.

The panel 262 may include the same or a similar configuration to the display 160 illustrated in FIG. 1. The panel 262 may be implemented to be flexible, transparent, and/or wearable. The panel 262, together with the touch panel 252, may be implemented as one module.

The panel 262 may include at least one sensor. For example, the panel 262 may include a pressure sensor (or force sensor). The pressure sensor may be a sensor capable of measuring the intensity of a pressure with respect to a user's touch. The pressure sensor may be implemented with the touch panel 252 in an integrated manner, or may be implemented as one or more sensors separately from the touch panel 252.

The hologram device 264 may show a three dimensional image in the air by using an interference of light.

The projector 266 may display an image by projecting light onto a screen. The screen may be located, for example, in the interior of, or on the exterior of, the electronic device.

The display 260 may further include a control circuit for controlling the panel 262, the hologram device 264, and/or the projector 266.

The interface 270 includes an HDMI 272, a USB 274, an optical interface 276, and a D-subminiature (D-sub) 278. Additionally or alternatively, the interface 270 may include a mobile high-definition link (MHL) interface, a secure digital (SD) card/multi-media card (MMC) interface, and/or an infrared data association (IrDA) standard interface.

The audio module 280 may convert a sound into an electrical signal, and vice versa. The audio module 280 may process sound information that is input or output through a speaker 282, a receiver 284, earphones 286, the microphone 288, etc.

The camera module 291 can photograph a still image and a video. The camera module 291 may include one or more image sensors (e.g., a front sensor or a back sensor), a lens, an ISP, or a flash (e.g., an LED or xenon lamp). That is, the camera module 291 may include a plurality of image sensors having different characteristics. The different characteristics may be requirements for determining characteristics of the photographed image, and be characteristics related to the type (black and white, color, etc.), the resolution, the angle of view of an image, etc.

The power management module 295 may manage the power of the electronic device. The power management module 295 may include a power management IC (PMIC), a charger IC, and/or a battery gauge. The PMIC may have a wired and/or wireless charging method. Examples of the wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure a residual quantity of the battery 296, and a voltage, a current, or a temperature while charging.

The battery 296 may include a rechargeable battery and/or a solar battery.

The indicator 297 may indicate a particular state (e.g., a booting state, a message state, a charging state, etc.) of the electronic device or a part (e.g., the processor 210) thereof. The motor 298 may convert an electrical signal into a mechanical vibration and may generate a vibration, a haptic effect, etc.

Although not illustrated, the electronic device may include a processing device (e.g., a GPU) for supporting mobile TV. The processing unit for supporting the mobile TV may process media data according to a standard, such as digital multimedia broadcasting (DMB), digital video broadcasting (DVB), MediaFlo™, etc.

Each of the above-described component elements of hardware according to the present disclosure may be configured with one or more components, and the names of the corresponding component elements may vary based on the type of electronic device. An electronic device according to an embodiment of the present disclosure may include at least one of the aforementioned elements. Some elements may be omitted or other additional elements may be further included in the electronic device. Also, some elements of the electronic device may be combined into one entity, which may perform functions identical to those of the corresponding elements before the combination.

Figure 3:
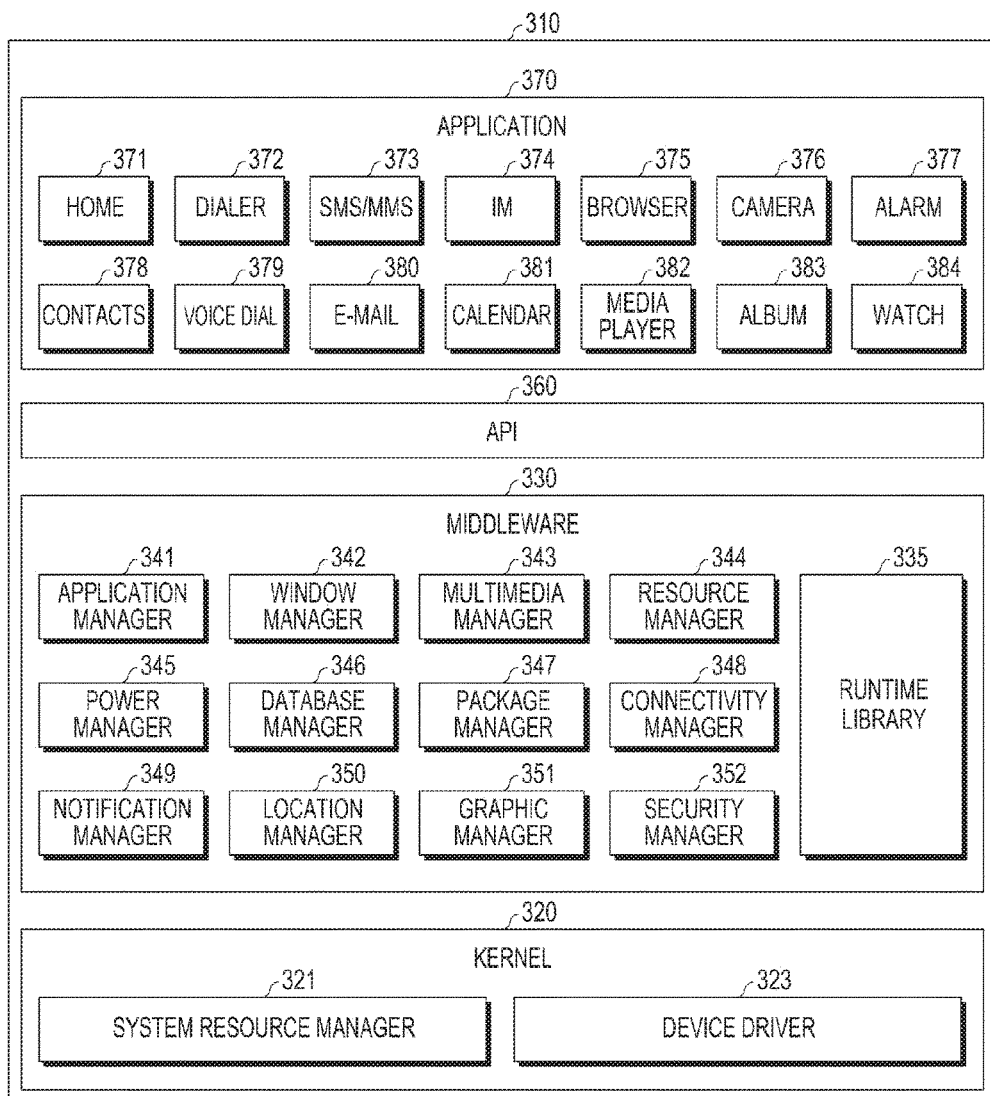
FIG. 3 illustrates a program module according to an embodiment of the present disclosure.

FIG. 3 illustrates a program module according to various embodiments of the present disclosure.

Referring to FIG. 3, the program module 310 may include an OS that controls resources relating to an electronic device and/or various applications that are executed in the OS. The operating system may be Android®, iOS®, Windows®, Symbian®, Tizen®, Bada®, etc.

The program module 310 includes a kernel 320, middleware 330, an API 360, and applications 370. At least some of the program module 310 may be preloaded on the electronic device, may be downloaded from an external electronic device (e.g., a server), etc.

Examples of the kernel 320, the middleware 330, the API 360, and the application 370 included in the program module 310 may be the kernel 181, the middleware 183, the API 185, and the application 187, respectively.

The kernel 320 includes a system resource manager 321 and a device driver 323. The system resource manager 321 may control, allocate, or retrieve system resources. The system resource manager 321 may include a process management unit, a memory management unit, or a file system management unit.

The device driver 323 may include a display driver, a camera driver, a Bluetooth driver, a shared memory driver, a USB driver, a keypad driver, a Wi-Fi driver, an audio driver, or an inter-process communication (IPC) driver.

The middleware 330 may provide a function required by the applications 370 in common, or may provide various functions to the applications 370 through the API 360 such that the applications 370 can efficiently use limited system resources within the electronic device. The middleware 330 includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, etc.

The application manager 341 may manage the life cycle of at least one of the applications 370. The window manager 342 may manage graphical user interface (GUI) resources used on a screen.

The multimedia manager 343 may identify formats required for reproducing various media files and may encode or decode a media file using a codec suitable for the corresponding format.

The resource manager 344 may manage resources, such as the source code, the memory, the storage space, etc., of at least one of the applications 370.

The power manager 345 may operate together with a basic input/output system (BIOS) to manage a battery or power and provide power information required for the operation of the electronic device.

The database manager 346 may generate, search for, and/or change a database to be used by at least one of the applications 370.

The package manager 347 may manage the installation or update of an application that is distributed in the form of a package file.

The connectivity manager 348 may manage a wireless connection, such as Wi-Fi, Bluetooth, etc.

The notification manager 349 may display or notify of an event, such as an arrival message, an appointment, a proximity notification, etc.

The location manager 350 may manage the location information of the electronic device.

The graphic manager 351 may manage a graphic effect to be provided to a user and a user interface relating to the graphic effect.

The security manager 352 may provide various security functions required for system security, user authentication, etc.

When the electronic device includes a telephone call function, the middleware 330 may further include a telephony manager that manages a voice or a video call function of the electronic device.

The middleware 330 may include a middleware module that forms a combination of various functions of the above-described elements. The middleware 330 may provide a module specialized for each type of OS in order to provide a differentiated function. Further, the middleware 330 may dynamically remove some of the existing elements, or may add new elements.

The API 360 is a set of API programming functions, and may be provided with different configurations according to the OS. For example, with respect to each platform, one API set may be provided for Android® or iOS®, and two or more API sets may be provided for Tizen®.

The applications 370 include a home application 371, a dialer application 372, a short messaging service/multimedia messaging service (SMS/MMS) application 373, an instant message (IM) application 374, a browser application 375, a camera application 376, an alarm application 377, a contacts application 378, a voice dial application 379, an e-mail application 380, a calendar application 381, a media player application 382, an album application 383, a clock application 384, etc. The applications 370 may also include a health care application (e.g., an application for measuring an amount of exercise or a blood glucose level, etc.) or an environmental information application (e.g., an application providing atmospheric pressure, humidity, or temperature information).

The applications 370 may also include an information exchange application for supporting information exchange between an electronic device and an external electronic device. The information exchange application may include a notification relay application for transferring specific information to an external electronic device or a device management application for managing an external electronic device.

The notification relay application may have a function of transferring notification information generated by other applications of the electronic device 101 (e.g., the SMS/MMS application 373, the e-mail application 380, the health care application, or the environmental information application) to the external electronic device. The notification relay application may receive notification information from the external electronic device and may provide the received notification information to a user.

The device management application may manage (e.g., install, delete, and/or update) at least one function of an external electronic device communicating with the electronic device (e.g., a function of turning on/off the external electronic device itself (or some components thereof) or a function of controlling the luminance (or a resolution) of the display), applications operating in the external electronic device, or services provided by the external electronic device (e.g., a telephone call service and a message service).

The applications 370 may include applications designated according to the attributes of an external electronic device (e.g., a health care application of a mobile medical appliance).

The applications 370 may include an application received from the external electronic device and/or a preloaded application or a third party application that may be downloaded from a server. The names of the elements of the program module 310, according to the embodiment illustrated in the drawing, may vary according to the type of OS.

At least a part of the programming module 310 may be implemented in software, firmware, hardware, or a combination of two or more thereof. At least some of the program module 310 may be implemented (e.g., executed) by a processor (e.g., the processor 210). At least some of the program module 310 may include a module, a program, a routine, a set of instructions, and/or a process for performing one or more functions.

Herein, the term "module" may indicate a unit including one of hardware, software, and firmware or a combination thereof. The term "module" may be interchangeably used with terms such as a unit, a logic, a logic block, a component, or a circuit. A "module" may be a minimum unit of an integrated component element or a part thereof. A "module" may be a minimum unit for performing one or more functions or a part thereof. A "module" may be mechanically or electronically implemented. A "module" according to the present disclosure may include at least one of an application-specific IC (ASIC) chip, a field-programmable gate array (FPGA), and a programmable-logic device for performing operations which have been known or are to be developed hereinafter.

At least some of the devices (e.g., modules or functions thereof) or the method (e.g., operations) according to the present disclosure may be implemented by instructions or commands stored in a computer-readable storage medium in a programming module form. The instructions, when executed by a processor (e.g., the processor 120), may cause the one or more processors to execute the function corresponding to the instruction. The computer-readable storage medium may be the memory 130.

The computer readable recoding medium may include a hard disk, a floppy disk, magnetic media (for example, a magnetic tape), optical media (e.g., a compact disc read only memory (CD-ROM) and a DVD), magneto-optical media (e.g., a floptical disk), a hardware device (e.g., a ROM, a RAM, a flash memory), etc. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

A programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed in a different order or may be omitted, or other operations may be added.

Figure 4A:
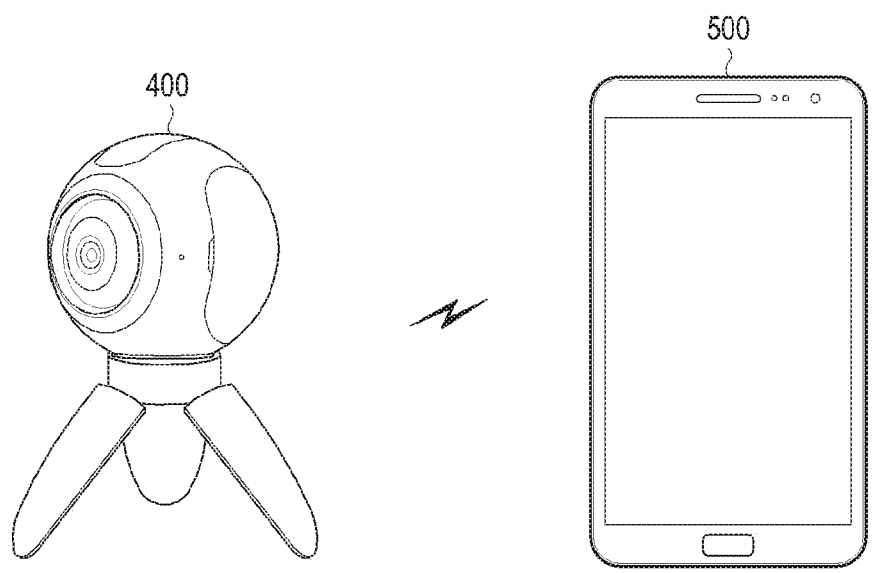
FIG. 4A illustrates an image processing system according to an embodiment of the present disclosure.

FIG. 4A illustrates an image processing system according to an embodiment of the present disclosure.

Referring to FIG. 4A, the image processing system transmits or receives images photographed in an omnidirectional manner, performs rendering thereof, and provides the same to the user. The image processing system includes a photographing apparatus 400 and an image processing apparatus 500.

The photographing apparatus 400 photographs an image in an omnidirectional manner. Usually, it is not easy to photograph an image in an omnidirectional manner using a single camera. Therefore, the photographing apparatus 400 may include a plurality of lenses or a plurality of cameras in order to photograph an omnidirectional image.

A fisheye lens may have an angle of view of 180 degrees or more. Accordingly, when a fisheye lens is set to looking at the sky, an area from the constellation of the sky to the horizon can be captured in a single image. The photographing apparatus 400 may include a plurality of such fisheye lenses to photograph images in an omnidirectional manner. As another example, the photographing apparatus 400 may include a plurality of cameras having a certain angle of view to photograph images in an omnidirectional manner. In this case, the plurality of cameras may be provided in the photographing apparatus 400 so as to cover all directions with reference to one point. The photographing apparatus 400 including one or more cameras may automatically and/or manually move (to the pitch, yaw, and/or roll directions) to photograph images in an omnidirectional manner.

The photographing apparatus 400 may include a plurality of cameras having a certain angle of view corresponding to the left eye and the right eye of the user. In this case, the photographing apparatus 400 may photograph images in an omnidirectional manner so as to photograph stereoscopic images including a plurality of omnidirectional images. Here, the example of the photographing apparatus 400 is surely not limited to the example described above.

The photographing apparatus 400 may also photograph an image in certain directions (e.g., the area of a square that corresponds to 120 degrees in the upper, lower, left, and right directions with reference to the lens of the photographing apparatus 400). In addition, the photographing apparatus 400 may photograph omnidirectional images, process images with respect to some directions among the omnidirectional image, and transmit the same to the image processing apparatus 500.

The photographing apparatus 400 may associate the photographed images with metadata relating thereto (e.g., photographing direction, range, area, and position) and record the same. In this case, the photographing apparatus 400 may associate metadata, i.e., at least one of the camera position, motion information, and direction information, received through a sensor (e.g., GPS, Wi-Fi fingerprint, and gyro, acceleration, geomagnetic sensors) with at least one of camera characteristics information (e.g., a camera calibration parameter, photographing state information) and the photographed image.

In addition, the photographing apparatus 400 may map the photographed omnidirectional image to a two-dimensional plane image, and encode the mapped two-dimensional plane image to store the same in a memory or transmit the same to the image processing apparatus 500.

When an omnidirectional image is mapped to a polyhedron consisting of triangular planes, the mapped two-dimensional plane image may include an area where triangular planes of the polyhedron are arranged on a two-dimensional plane.

The omnidirectional image may be an image independent of the polyhedron associated with the two-dimensional plane image. For example, the omnidirectional image may be an image mapped to a two-dimensional plane by an equirectangular projection (ERP), cube projection, and cylindrical projection schemes. The omnidirectional images may be images associated with depth information determined through a distance sensor (e.g., a Kinect™ camera, a lidar, a stereo camera, a laser distance measuring device. etc.).

The photographing apparatus 400 may be a virtual camera at an arbitrary position in a virtual reality space (e.g., a 3D space implemented in a game), and may be image information received in connection with virtual objects within the virtual reality based on the characteristics (e.g., position, orientation direction, angle of view, and/or range) of the virtual camera. For example, an FOV of an avatar in a game may correspond to the FOV of a virtual camera, and the object image area in the virtual reality, displayed through the same, may be a part of the omnidirectional image.

The image processing apparatus 500 performs rendering of an image. Specifically, the image processing apparatus 500 receives the bit stream of the mapped two-dimensional plane image from the photographing apparatus 400 and performs decoding of the same. The image processing apparatus 500 performs rendering using the decoded two-dimensional plane image, and displays the rendered frame. The image processing apparatus 500 may be various electronic devices for processing images, e.g., a virtual reality (VR) device such as an HMD, a mobile phone, a PC, a TV, a tablet PC, etc.

In this case, the photographing apparatus 400 and the image processing apparatus 500 may include communication modules such as a Wi-Fi module, a Bluetooth module, and/or a ZigBee module to perform communication.

The image processing system of FIG. 4A provides a rendered image to a user through multiple steps of image processing.

Figure 4B:
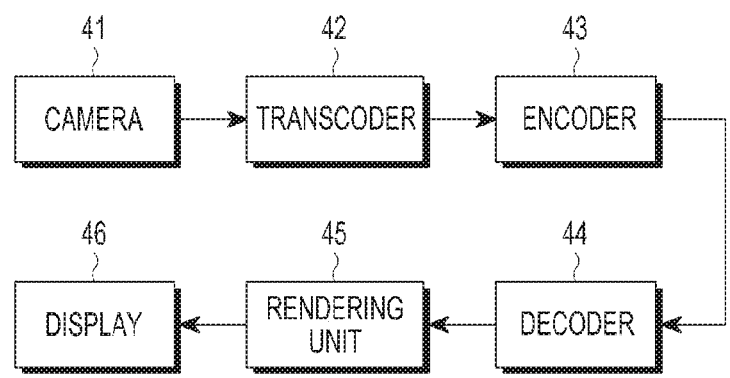
FIG. 4B illustrates an image processing process of an image processing system according to an embodiment of the present disclosure.

FIG. 4B illustrates an image processing procedure of an image processing system according to an embodiment of the present disclosure.

Referring to FIG. 4B, an omnidirectional image is sequentially processed by a camera 41, a transcoder 42, an encoder 43, a decoder 44, a rendering unit 45, and a display 46.

Here, it is assumed that the camera 41, the transcoder 42, and the encoder 43 are included in a transmitting end (e.g., the photographing apparatus 400), and the decoder 44, the rendering unit 45, and the display 46 are included in a receiving end (e.g., the image processing apparatus 500). Although image processing in FIG. 4B is divided into a transmitting end and a receiving end for the convenience of description, each element of an image processing system may be all included in one device or various combinations thereof may be included in the other device.

The camera 41 photographs an omnidirectional image. For example, when the camera 41 is provided with a pair of fisheye lenses having an angle of view of 180 degrees or more, the camera 41 may photograph the omnidirectional image using a pair of fisheye lenses. The camera 41 may transmit two images photographed using a pair of fisheye lenses to the transcoder 42. As another example, when the camera 41 is provided with a plurality of cameras, the plurality of cameras may photograph spaces in different directions. In this case, the plurality of cameras may generate a plurality of images photographed in different directions as a separate or one two-dimensional image and transmit the same to the transcoder 42.

An image processed by the image processing system is not limited to an image photographed by the camera 41. That is, the image to be processed by the image processing system may be a virtual image (e.g., a game image and an animation image viewed from the viewpoint of a virtual camera based on a virtual space). In addition, the image processed by the image processing system may be an image photographed in a space in one direction or in a plurality of directions. For example, the image processing system may process an image photographed using one fisheye lens of a pair of fisheye lenses.

The transcoder 42 maps omnidirectional images to two-dimensional images. For example, the transcoder 42 may map two images photographed by a fisheye lens to three-dimensional images and map the same to two-dimensional images. The transcoder 42 may map the omnidirectional image to the outer surface or inner surface of the virtual three-dimensional model in order to map the omnidirectional image to the three-dimensional image.

The transcoder 42 may directly map omnidirectional images to two-dimensional images. For example, a transformation matrix A for mapping an omnidirectional image to a three-dimensional image and a transformation matrix B for transforming a three-dimensional image into a two-dimensional image are obtained. A transformation matrix C may be obtained based on the transformation matrix A and the transformation matrix B, and the transformation matrix C may be stored as metadata and then used for a computation of transforming an omnidirectional image into a two-dimensional image. For example, the transformation matrix A may be obtained based on a camera calibration parameter, and the transformation matrix B may be an arbitrary matrix for transforming a three-dimensional image into a two-dimensional image, and may be determined according to the type of three-dimensional image and the type of two-dimensional image.

The transcoder 42 may perform mapping of a three-dimensional image to a two-dimensional image, and may generate metadata on the relationship of the coordinates between the mapped three-dimensional image and the mapped two-dimensional image. The transcoder 42 may transmit at least one of the mapped two-dimensional image and metadata to the encoder.

The encoder 43 performs encoding of the two-dimensional image transmitted from the transcoder 42. For example, the encoder 43 may perform encoding based on codec standards such as H.264, MPEG-4, HEVC, etc.

The encoder 43 may store the encoded image data of the two-dimensional image in a memory in a video or still image format. In addition, the encoder 43 may transmit the encoded image data to another electronic device in a streaming or file format. The stored or transmitted encoded image data may be transmitted to a decoder.

Metadata may be stored in a memory together with the encoded image data, or may be transmitted in a streaming or file format. The metadata may be generated as a separate document (e.g., an omnidirectional media application format (OMAF) document) and associated with the encoded image data and then stored, or, when there is a request for the image data, associated with the image data and then transmitted. For example, the metadata may be associated with the encoded image data and automatically called together with the encoded image data.

When there is a request for encoded image data, the metadata may be transmitted together with, or separately from, the encoded image data or may be transmitted to a specific apparatus or module separately from the request for the image data.

The receiving end includes a decoder 44, a rendering unit 45, and a display 46.

The decoder 44 receives the transmitted image data encoded by the encoder 43 and performs decoding thereof. The decoder 44 may perform decoding using the same codec standard (e.g., H.264, MPEG-4, HEVC, etc.) as the codec standard used in encoding the two-dimensional image mapped by the encoder 43.

The rendering unit 45 performs rendering based on the decoded two-dimensional image (hereinafter, input frame). The rendering unit 45 may additionally use metadata for rendering. The metadata may be generated in the transmitting end and transmitted to the receiving end, or may already be stored in a storage unit of the receiving end. For example, the metadata may be included in the exif field of JPEG when the same is encoded by JPEG in the transmitting end, and the metadata may be included in a moov field of MPEG-4 when the same is compressed by MPEG-4 in the transmitting end. In addition, the metadata may be included at the end part of an image frame. The metadata may be provided in an XML document format such as X3D.

The display 46 may display the rendered output frame. The display 46 may be implemented as one or more of an LCD, an OLED, a flexible display, an aerial image display, a hologram, an HMD, a head up display (HUD), and a 3D display.

For convenience of description, the image processing system of FIG. 4B is divided into the camera 41, the transcoder 42, the encoder 43, the decoder 44, the rendering unit 45, and the display 46. However, this is merely an example, and the image processing system may be configured by only a part of the above configurations, or may be implemented by combining some or all of the above configurations with other configurations.

Although the transcoder 42, the encoder 43, the decoder 44, and the rendering unit 45 among the above-described configurations are described as being implementable by physical hardware, the transcoder 42, the encoder 43, the decoder 44, and the rendering unit 45 may be provided as software for performing the above-described functions and the same is stored in the memory 230. The transcoder 42, the encoder 43, the decoder 44, and the rendering unit 45 may also be loaded by a processor such as a CPU or a GPU, and the functions thereof may be driven.

Various methods are available for mapping an image that photographs a three-dimensional space to a two-dimensional image. A typical example of the methods is an ERP, which is an equidistant cylindrical projection that transforms spherical coordinates into Cartesian coordinates. However, when ERP is used to map a three-dimensional spherical surface to a two-dimensional plane, the closer the image is to both of the poles (i.e., the north-pole and the south-pole) of the sphere, the larger the distortion that occurs in the two-dimensional plane. Therefore, ERP has a limitation in accurately representing the original three-dimensional image.

According to an embodiment of the present disclosure, the transcoder 42 may map an image photographed using the camera 41 to a polyhedron, and may map the image mapped to each face of the polyhedron to a two-dimensional image. The transcoder 42 may map an image photographed through the camera 41 to a surface of a first three-dimensional object, and may map an image mapped to the surface of the first three-dimensional object to the surface of a second three-dimensional object through a calculation that transforms the first three-dimensional object to the second three-dimensional object. Thereafter, the transcoder 42 may map the image mapped to the surface of the second three-dimensional object to a two-dimensional plane. For example, the transcoder 42 may map an image photographed by the camera 41 to a three-dimensional spherical object having a certain radius (e.g., a camera focal length or depth information), and map the three-dimensional spherical object to each face of an octahedron. Thereafter, the transcoder 42 may map each face of the octahedron to a two-dimensional image. An example of such a method is an OHP method.

Although the example described above maps an image photographed by the camera 41 to a spherical object and then maps the same to a two-dimensional image, the present disclosure is not limited to a method in which an image photographed by the camera 41 is mapped to a spherical object. For example, the OHP method may surely be directly applied to a fisheye image, an ERP image, a Craster parabolic projection (CPP) image, and an image mapped to various types of polyhedrons (for example, a tetrahedron, a dodecahedron, an icosahedron, etc.) to generate a two-dimensional image. In addition, it is not necessary that the image mapped to a spherical object or a two-dimensional image herein be an image photographed by the camera 41. For example, a virtual image may be mapped to a spherical object or a two-dimensional image.

An OHP method according to an embodiment of the present disclosure includes mapping a three-dimensional spherical surface to a two-dimensional plane using an octahedron platonic solid.

Figure 5A:
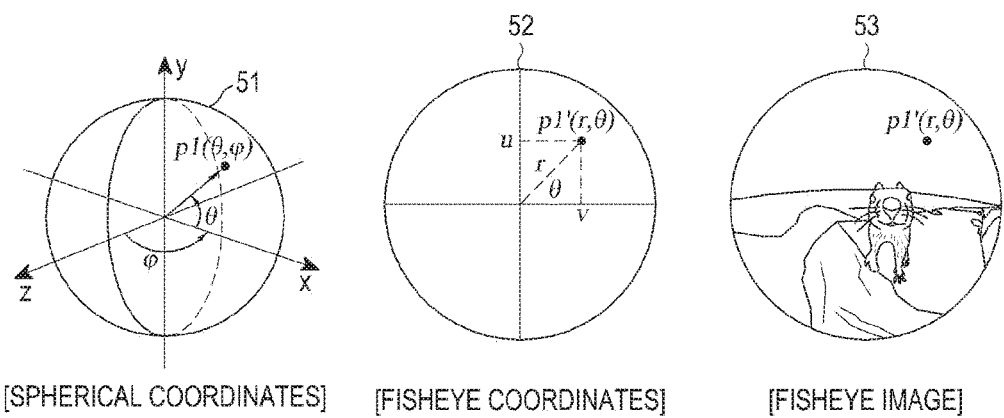
FIGS. 5A to 5C illustrate an octahedron projection (OHP) method according to an embodiment of the present disclosure.
Figure 5B:
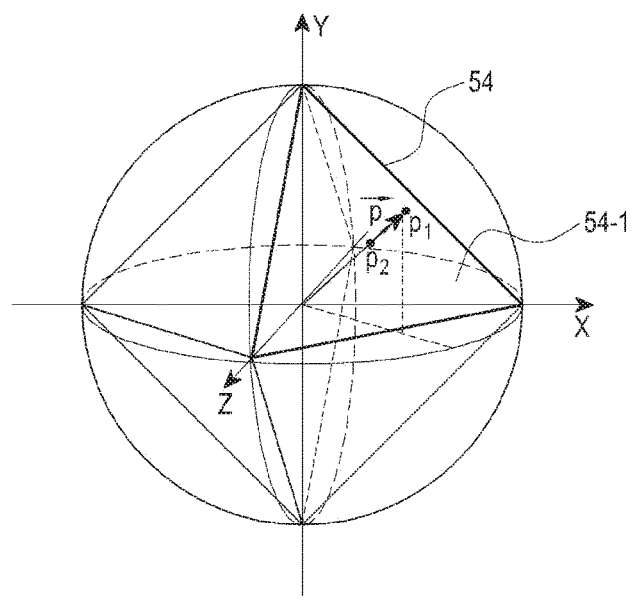
Figure 5C:
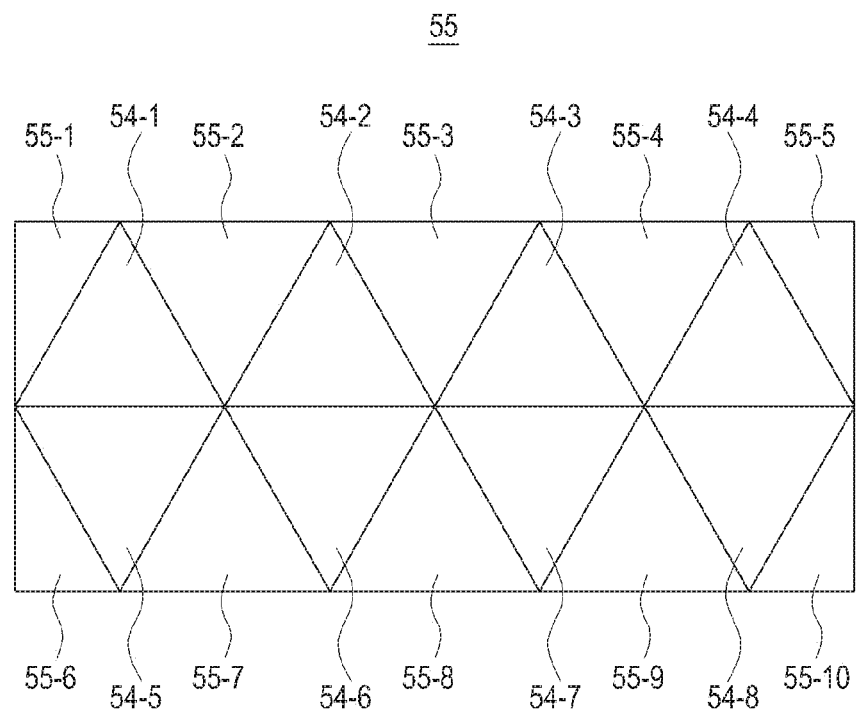

FIGS. 5A to 5C illustrate an OHP method according to an embodiment of the present disclosure.

Specifically, FIG. 5A illustrates a process of transforming spherical coordinates 51 into the coordinates (hereinafter, fisheye coordinates) 52 of an image (hereinafter, a fisheye image) 53 photographed with a fisheye lens.

It is assumed that the point of the fisheye coordinates 52 of the fisheye image 53 corresponding to a point p1 (Φ,θ) of the spherical coordinate is p1' (r,θ). Here, the relationship between Φ and θ of the spherical coordinates 51 and r, u, and v of the fisheye coordinate 52 is shown in Equation (1) below.

$$r=\varphi/(\pi/2), u=\frac{1}{2}(1+\cos\theta), v=\frac{1}{2}(1+\sin\theta) \quad (1)$$

In Equation (1), the point p1' (r,θ) of the fisheye image 53 corresponds to the point p1 (Φ,θ) of the spherical coordinate 51. Not only the point p1' (r,θ), but also all the points included in the fisheye image 53, may correspond to the spherical coordinates 51. The above-mentioned points may be pixels. Accordingly, the pixel values of all the pixels included in the fisheye image 53 may be matched to the spherical coordinates 51.

The transcoder 42 may transform the points of the spherical coordinates 51 into the coordinates included in the faces of an octahedron.

FIG. 5B illustrates an example of a method of making the point p1 of the spherical coordinates 51 correspond to the point p2 included in the face 54-1 of the octahedron 54.

For example, it is assumed that the vector from a center point of the spherical coordinates 51 to the point p1 is a vector $\vec{p}$.

Here, the point p1 and the point p2 exist on the vector $\vec{p}$. That is, the point p2 is a point of intersection between the vector $\vec{p}$ and the face of the octahedron.

Consequently, the point p1' of the fisheye image 53 is matched to the point p2 on the face 54-1 of the octahedron 54. The pixel value of the pixel that corresponds to the point p1' of the fisheye image may be configured to be a pixel value of the pixel that corresponds to the point p2 on the face 54-1 of the octahedron 54.

The faces of the octahedron 54 may be mapped to the two-dimensional plane.

For example, as illustrated in FIG. 5C, the respective faces of the octahedron 54 may be mapped to first areas 54-1 to 54-8 of the two-dimensional image. Here, second areas 55-1 to 55-10 are areas to which the respective faces of the octahedron 54 are not mapped.

The second areas 55-1 to 55-10 correspond to the "no data" area where the faces of the octahedron 54 are not mapped and do not include image data. Accordingly, the two-dimensional image in which the fisheye image 53 has been mapped according to the OHP method has a substantially much smaller capacitance of image data as compared to the two-dimensional image obtained by mapping the fisheye image 53 to a three-dimensional spherical object and then mapping the image of the spherical object according to the ERP method. Accordingly, when encoding is performed using the two-dimensional image in which the fisheye image 53 is mapped according to the OHP, a larger compression efficiency can be obtained than when using ERP.

However, the respective faces of the octahedron 54 to which the spherical coordinates 51 are mapped may be mapped again to two-dimensional images. Here, there are various methods of mapping to a two-dimensional image.

Figure 6:
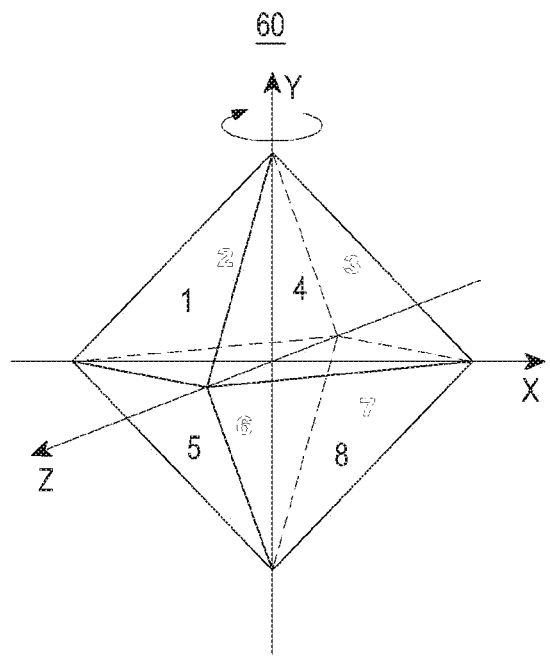
FIG. 6 illustrates an octahedron to which spherical coordinates are mapped according to an embodiment of the present disclosure.

FIG. 6 illustrates an octahedron to which spherical coordinates are mapped according to an embodiment of the present disclosure.

Referring to FIG. 6, the octahedron includes eight faces numbered from 1 to 8. Faces 1 to 4 of the octahedron are upper half faces, and faces 5 to 8 are lower half faces. Accordingly, the number of the upper half face and the number of the lower half face are equal to ½ of the total number of faces. In addition, each side of the triangles lying on the plane formed by the X axis and the Z axis has an orientation of 360/(N/2) around the Y axis of the polyhedron. For example, each face of the octahedron divides, by 90 degrees, all directions, i.e., 360 degrees that surround Y axis in the upper half and lower half with reference to the Y axis.

As another example, when there is a polyhedron with 16 faces being constituted of eight of the upper half face and lower half face and each of the faces is constituted of an isosceles triangle, each face of the polyhedron with 16 faces divides, by 45 degrees, all directions, that is, 360 degrees that surround Y axis with reference to the Y axis.

Figure 7:
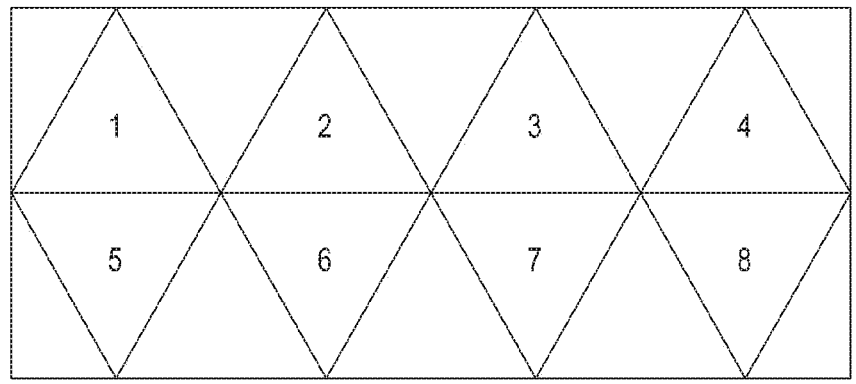
FIGS. 7 to 9, 10A to 10C, 11A to 11D, 12A to 12C, 13A, 13B, and 14 illustrate a method in which each face of an octahedron is arranged on a two-dimensional image according to an embodiment of the present disclosure.

FIG. 7 illustrates a method in which each face of an octahedron according to an embodiment of the present disclosure is arranged in a two-dimensional image.

Referring to FIG. 7, the upper half face of the octahedron is arranged on the upper side of the two-dimensional image from left to right in the clockwise direction from face 1 to face 4. In addition, the lower half face of the octahedron is also arranged on the lower side of the two-dimensional image from left to right in the clockwise direction from face 5 to face 8.

Figure 8:
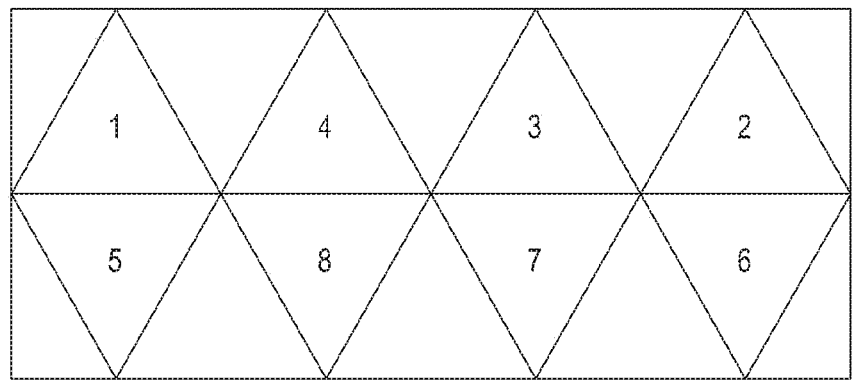

FIG. 8 illustrates a method in which each face of an octahedron according to an embodiment of the present disclosure is arranged in a two-dimensional image.

Referring to FIG. 8, the upper half face of the octahedron is arranged on the upper side of the two-dimensional image from left to right in the clockwise direction in the order of face 1, face 4, face 3, and face 2. In addition, lower half of the octahedron is arranged on the lower side of the two-dimensional image from left to right in the clockwise direction in the order of face 5, face 8, face 7, and face 6.

Referring to FIGS. 7 and 8, the upper half and lower half faces (face 1 and face 5, face 2 and face 6, face 3 and face 7, face 4, and face 8) having one corner in common also share one corner in the two-dimensional images, which ensures continuity of the images photographed by a camera in the two-dimensional images, as much as possible. Accordingly, the encoding unit may perform encoding using an image in which the continuity of the view is ensured as much as possible, thereby improving the compression efficiency.

Figure 9:
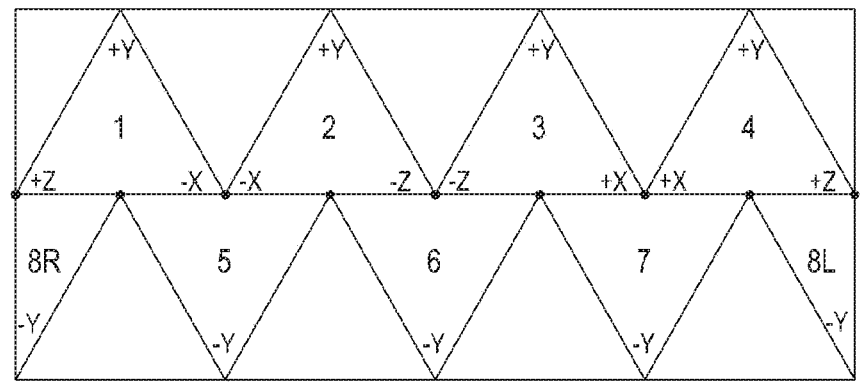

FIG. 9 illustrates a method in which each face of an octahedron according to an embodiment of the present disclosure is arranged in a two-dimensional image.

Referring to FIG. 9, the upper half face of the octahedron is arranged on the upper side of the two-dimensional image from left to right in the clockwise direction from face 1 to face 4. When the lower half face of the octahedron is rotated by 45 degrees in a counterclockwise direction around Y axis of the octahedron, face 5 to face 8 of the lower half face are arranged on the lower side of the two-dimensional image from left to right in the clockwise direction. In FIG. 9, a face 8L is the left side of face 8, and a face 8R is the right side of face 8.

Each face of the octahedron may be arranged according to an array method of minimizing an area (i.e., a "no data" area) to which no image is mapped in the two-dimensional image. The "no data" area may be removed so as to minimize the size of the two-dimensional image, thereby improving the encoding efficiency and the image transmission efficiency. In other words, because the "no data" area has a predetermined pixel value (e.g., one or more of black, Chroma key color, and transparency) while having no image mapped thereto, as the "no data" area is minimized, the capacity of data to be encoded or transmitted can be reduced.

Figure 10A:
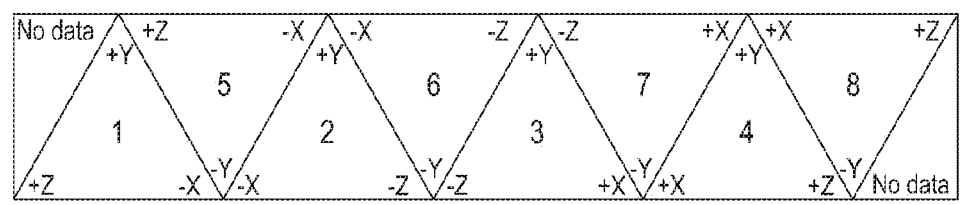
Figure 10B:
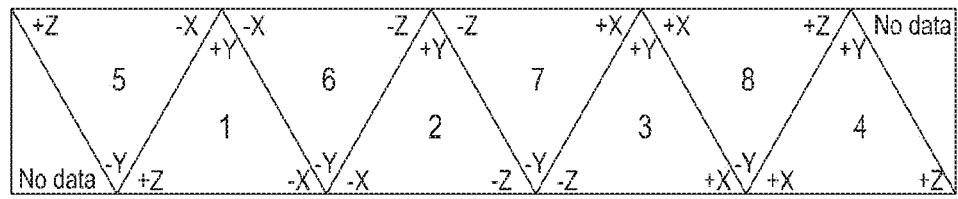

For example, as illustrated in FIGS. 10A and 10B, the upper half face (face 1 to face 4) and the lower half face (face 5 to face 8) of the octahedron may be arranged in the two-dimensional images in an alternating manner.

Figure 10C:
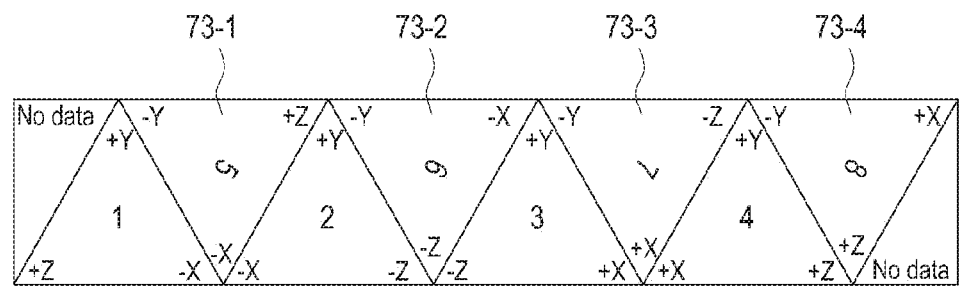

Alternatively, as illustrated in FIG. 10C, each of faces 73-1, 73-2, 73-3, and 73-4 obtained by the upper half face (face 1 to face 4) and the lower half face (face 5 to face 8) of the octahedron being rotated by a predetermined angle may be arranged in the two-dimensional image in an alternating manner.

Referring to FIG. 7, FIG. 8, FIG. 9, FIG. 10A to FIG. 10C, when a three-dimensional image is mapped to a two-dimensional image, although minimized, a "no data" area still exists. Therefore, it is required to consider an array for further removing the "no data" area.

FIGS. 11A to 11D illustrate a method in which each face of an octahedron is arranged on a two-dimensional image according to an embodiment of the present disclosure.

Figure 11A:
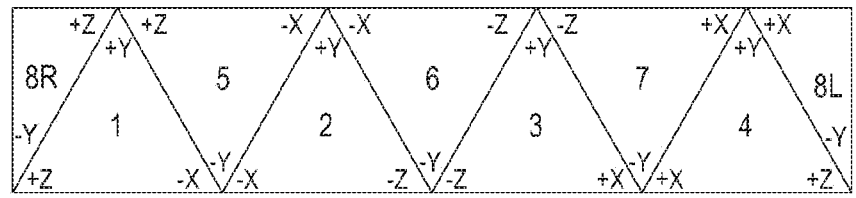
Figure 11B:
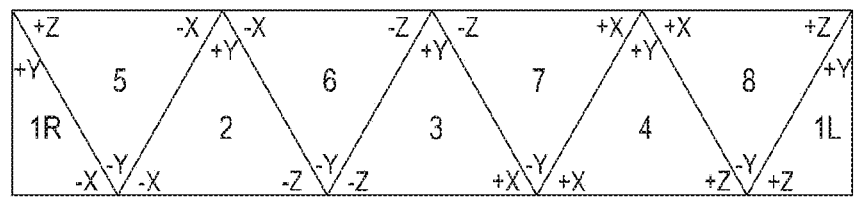
Figure 11C:
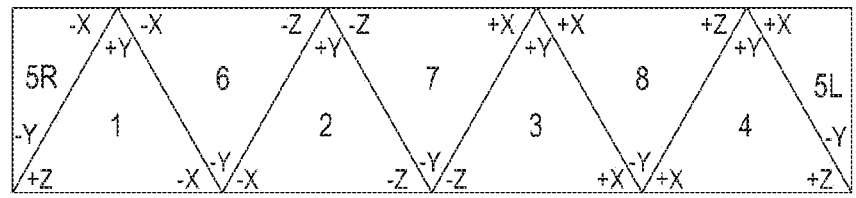
Figure 11D:
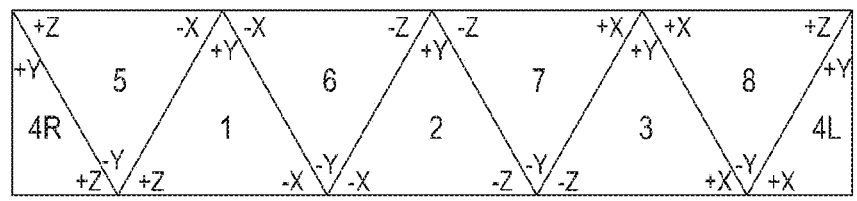

Specifically, a method of dividing the face 8 of the octahedron into face 8L (left) and face 8R (right) and mapping the same to a two-dimensional image is illustrated in FIG. 11A, a method of dividing face 1 of the octahedron into face 1L and face 1R and mapping the same to a two-dimensional image is illustrated in FIG. 11B, a method of dividing face 5 of the octahedron into 5L and 5R and mapping the same to a two-dimensional image is illustrated in FIG. 11C, and a method of dividing face 4 of the octahedron into face 4L and face 4R and mapping the same to a two-dimensional image is illustrated in FIG. 11D.

In accordance with an embodiment of the present disclosure, a shearing method may be used to remove the "no data" area. In the shearing method, when faces included in an octahedron are mapped to a two-dimensional image, each area of the two-dimensional image has a continuity.

Figure 12A:
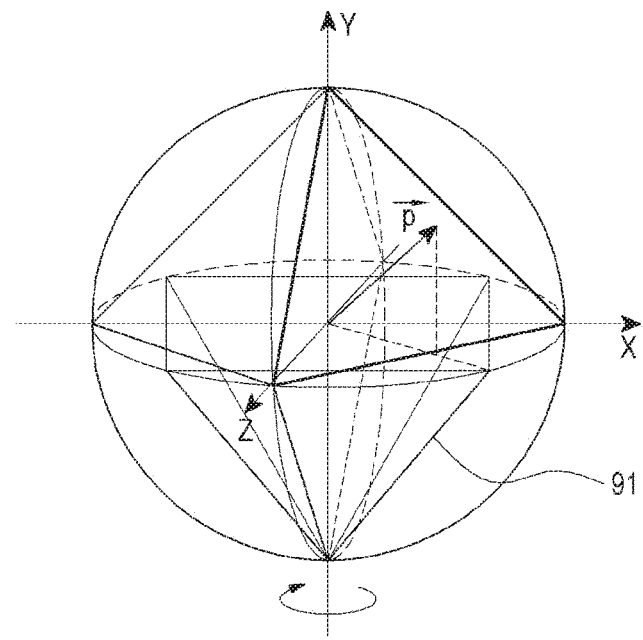
Figure 12B:
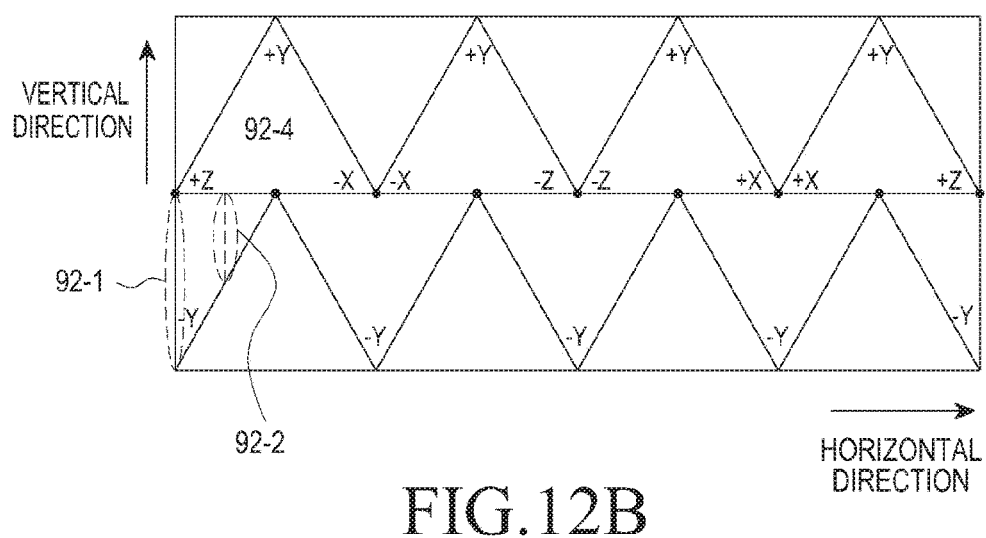
Figure 12C:
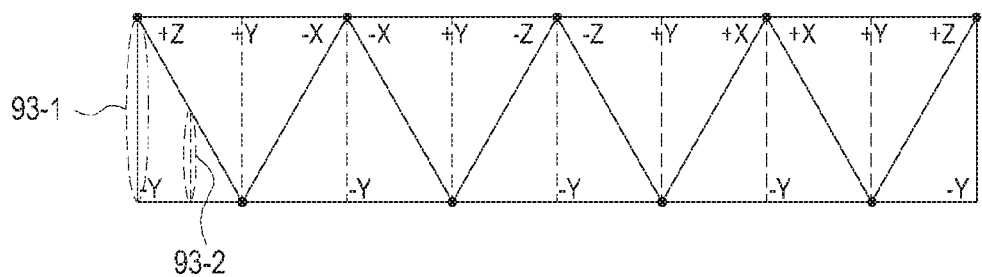

Referring to FIGS. 12A to 12C, if the lower half 91 of the octahedron in FIG. 12A is rotated at 45 degrees around the y axis, each face of the octahedron is mapped in a form such that the lower half triangles is shifted by ½ of the length of sides of the triangles as the two-dimensional image illustrated in FIG. 12B. In this case, points in the vertical direction (e.g., pixels in the vertical direction) of the upper half face and the lower half face to which the image is mapped are connected to each other. That is, pixels corresponding to an image that is not the "no data" area configure one continuous line segment when vertically scanned the same, and the length of the line segment is equal to the maximum height of one triangle.

Points in the vertical direction (e.g., pixels in the vertical direction) of the two-dimensional image of FIG. 12B are moved in the vertical direction.

Referring to FIG. 12C, points included in a first area 92-1 are moved to points included in a second area 93-1, and points included in a third area 92-2 are moved to points included in a fourth area 93-2, which is the same when successive pixel columns included in each face of respective pixels in the vertical direction are vertically moved to the uppermost end or lowermost end of a two-dimensional image. Accordingly, the respective faces of the octahedron are mapped to a two-dimensional image as illustrated in FIG. 12C.

In addition, as the respective faces of the octahedron are transformed to the sheared two-dimensional image as illustrated in FIG. 12C, the "no data" area is removed, and the vertical length thereof is reduced to ½ as compared to the previous two-dimensional image as illustrated in FIG. 12B.

More specifically, when a polyhedron consisting of N equilateral triangles or isosceles triangles (where N is an integer and a multiple of 2) is divided into upper half and lower half, and the number of the upper half and lower half faces are N/2, respectively, each face occupies 360/(N/2) angles with reference to the central axis connecting the two poles. When the upper half or the lower half is rotated by {360/(N/2)}/2, points in the vertical direction where the upper half face and the lower half face are continuous in the two-dimensional image area may be obtained. The "no data" area may be removed by vertically moving the continuous points in the vertical direction and mapping the same to a rectangle having the height of one triangle.

Figure 13A:
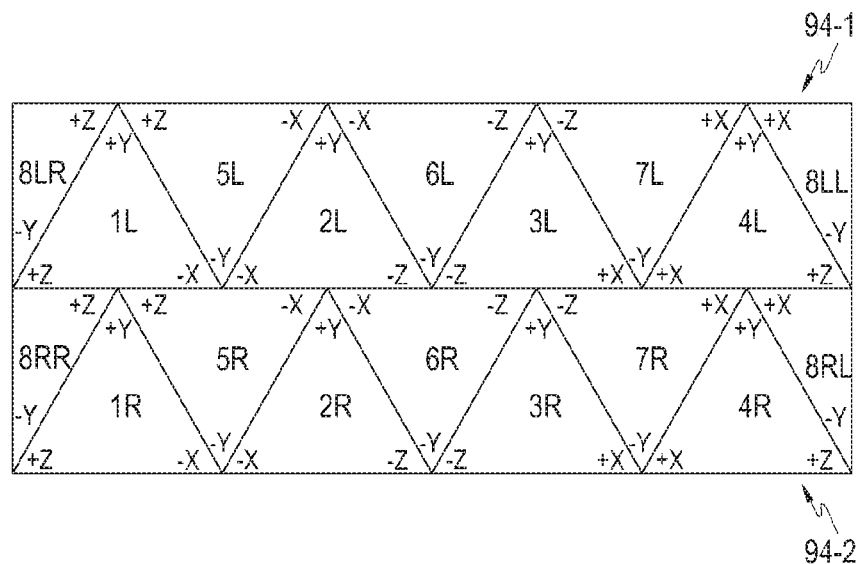
Figure 13B:
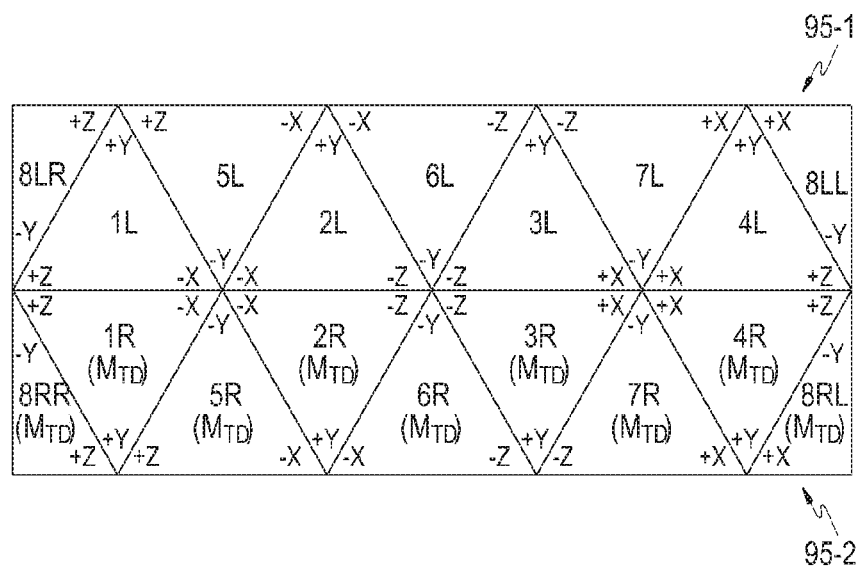

The mapping methods described above may also be applied to a stereoscopic image, as illustrated in FIGS. 13A and 13B, where it is assumed that two images, i.e., a left eye image and a right eye image, are input together as a stereoscopic image.

FIG. 13A illustrates a stereoscopic image as metadata when left eye and right eye images are arranged in a top-down form and generates the two-dimensional image. In this case, the image illustrated in FIG. 13A may be distinguished by one or more identifiers (e.g., stereoscopic=true, stereoscopic_type=top-down) indicating that the array of the left eye and right eye images are arranged in a top-down form.

Referring to FIG. 13A, the left eye image is mapped to an upper side 94-1 of the two-dimensional image, and the right eye image is mapped to a lower side 94-2 of the two-dimensional image. In relation to the upper side (94-1) face 1, a face 1L and a face 1R are images corresponding to the left eye and the right eye, respectively, and in relation to the lower side (94-2) face 8, face 8LL represents the left half of a triangle corresponding to the left eye image, and 8RL represents the left half of a triangle corresponding to the right eye image.

Referring to FIG. 13B, the left eye image is mapped to an upper side 95-1 of a two-dimensional image, and the right eye image is mapped to a lower side 95-2 of the two-dimensional image. $M_{TD}$ is a symbol indicating that the triangle is mirrored in the top-down direction. The lower side 94-2 triangles in FIG. 13A may be arranged to have a closer image at the boundaries of the left eye and right eye triangles as a result of being top-down mirrored like the triangles of the lower side 95-2. For example, in the two-dimensional image of FIG. 13A, the face 1L and the face 1R are images most similar to each other with respect to the upper face 1 of the octahedron. However, the number of pixels adjacent to each other is small and the degree of similarity between images in the adjacent areas is low. That is, the lower side connecting +Z and −X in the face 1L and the +Y (north-pole) on the face 1R are adjacent to each other. However, in the two-dimensional image of FIG. 13B, since face 1L and face 1R connect +Z and −X and are arranged to be adjacent to each other, the degree of similarity of images in areas where the triangles contact is relatively high. Accordingly, in performing encoding, the transmission efficiency can be improved as well as the compression efficiency.

A method of mapping upper end faces of the left eye image and the right eye image of a stereoscopic shape having a shape of the octahedron to the upper side of a two-dimensional image, and of mapping lower end faces thereof to the lower side of a two-dimensional image is also possible. That is, each of the triangles of the left eye and the right eye images corresponding to the face 1 to face 4 may be arranged on the upper side, and each of the triangles of the left eye and the right eye images corresponding to the face 5 to face 8 may be arranged on the lower side (hereinafter, referred to as a mixed type), which has the effect of arranging triangles that include relatively similar images to be contiguous with each other, thereby improving the compression efficiency and transmission efficiency in performing encoding. However, when a three-dimensional image is mapped to a two-dimensional image, it may consider a method for reducing the width (e.g., the horizontal resolution and the number of pixels arranged in the row) of the two-dimensional image. Because the width of a two-dimensional image used for rendering is limited for each electronic device, a two-dimensional image can be rendered in various electronic devices as long as the two-dimensional image has a smaller width.

Figure 14:
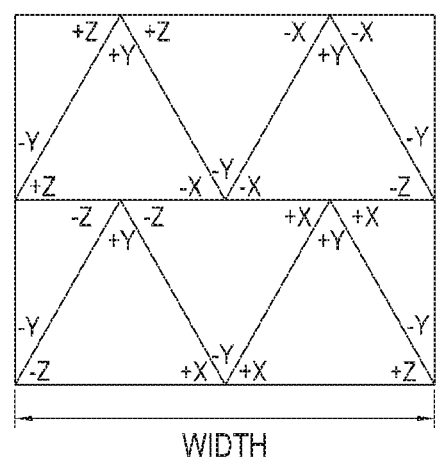

Referring to FIG. 14, the two-dimensional image includes the same amount of image data as the two-dimensional image of FIG. 11A. However, the width of the two-dimensional image of FIG. 14 is only half of the two-dimensional image of FIG. 11A. Here, the method of adjusting the width of the mapped two-dimensional image may surely be equally applied to a method of mapping a stereoscopic image including left eye and right eye images to a two-dimensional image.

According to various embodiments, a left eye image and a right eye image are generated in the form of a two-dimensional image of FIG. 14, and then the same is continuously arranged in the left and right so as to be generated as a single two-dimensional image. Metadata representing such a structure may include the identifier indicating whether it is a stereoscopic image, and may include the arrangement form of a left eye and a right eye (e.g., stereoscopic=true, stereoscopic_type=side-by-side or left-right). A two-dimensional image in which the left eye image and the right eye image are arranged in a top-down form may also be generated.

Areas included in the mapped two-dimensional image may include a padding area. The padding area is used, in a rendering process, which will be described later, of rendering a boundary of a plurality of areas included in a two-dimensional image. By performing the rendering using the padding area, the quality of the boundary portion of the plurality of areas included in the two-dimensional image can be guaranteed. For example, when two adjacent faces are rendered, the padding area may provide sufficient image information on adjacent portions of the two faces, thereby preventing distortion or noise from occurring at the boundary line or boundary surface. In addition, when a single image is generated by stitching images of two faces using pixel information of each of the padding areas associated with the adjoining portions of two faces, a higher quality image can be obtained.

Figure 15A:
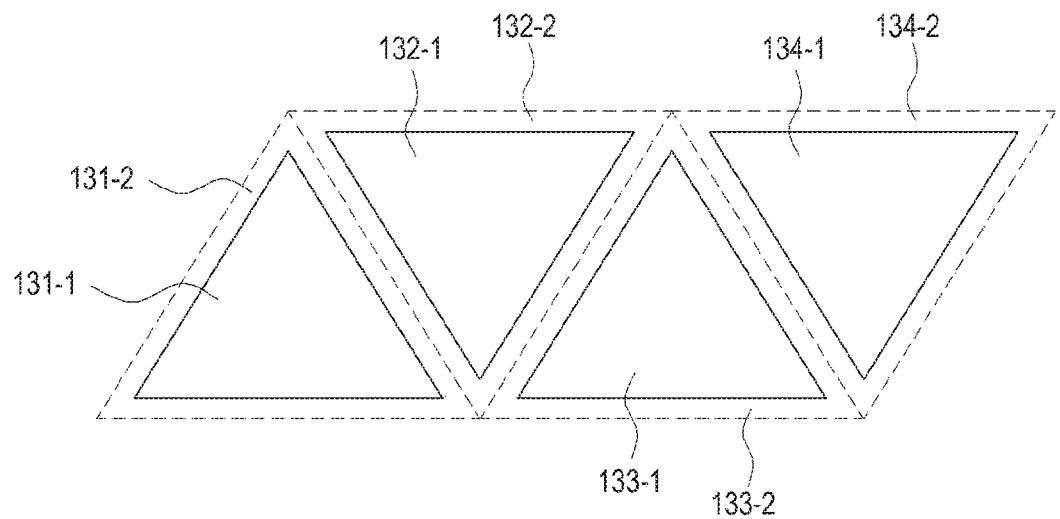
FIGS. 15A and 15B illustrate a method of setting a padding area according to an embodiment of the present disclosure.
Figure 15B:
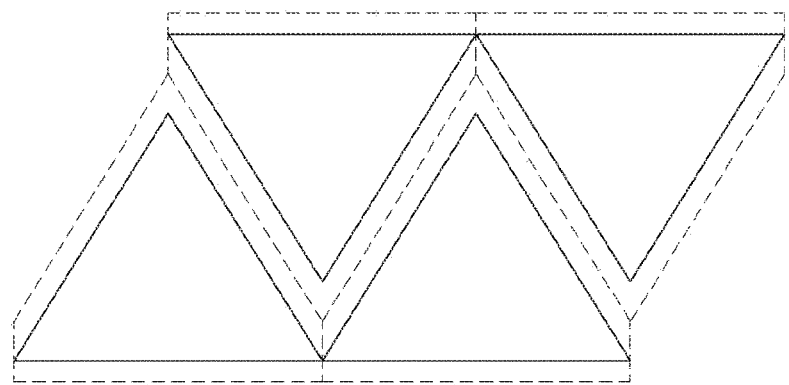

FIGS. 15A and 15B illustrate a method of setting padding area according to an embodiment of the present disclosure.

Referring to FIG. 15A, padding areas 131-2, 132-2, 133-2, and 134-2 are set over all the boundary portions of the respective areas 131-1, 132-1, 133-1, and 134-1 of a two-dimensional image.

FIG. 15B sets the padding to reduce the width of a two-dimensional image therein, as compared to the two-dimensional image of FIG. 15A. According to the padding area setting method in FIG. 15B, when it is assumed that an ERP image is mapped to the two-dimensional image, the width of the ERP image and the width of a two-dimensional image to which the OHP method is applied to the ERP image and mapped are the same.

When the padding area is set, a pixel value may be set in the set padding area.

Figure 16A:
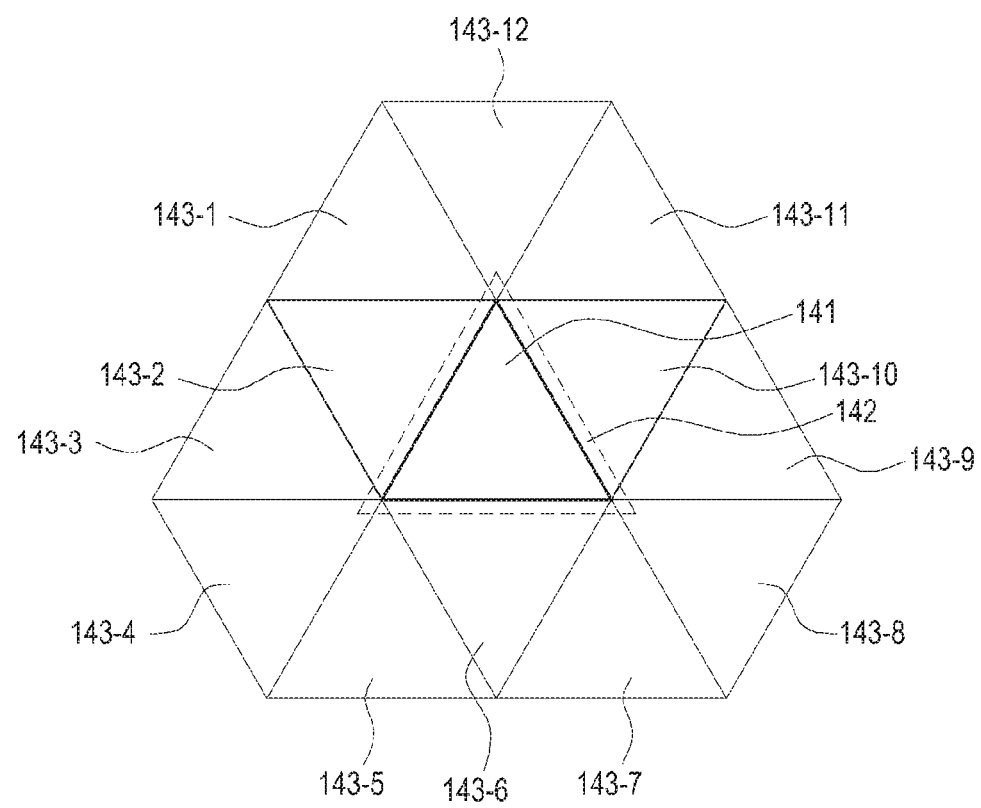
FIGS. 16A to 16C illustrate a method of setting a padding area according to an embodiment of the present disclosure.
Figure 16B:
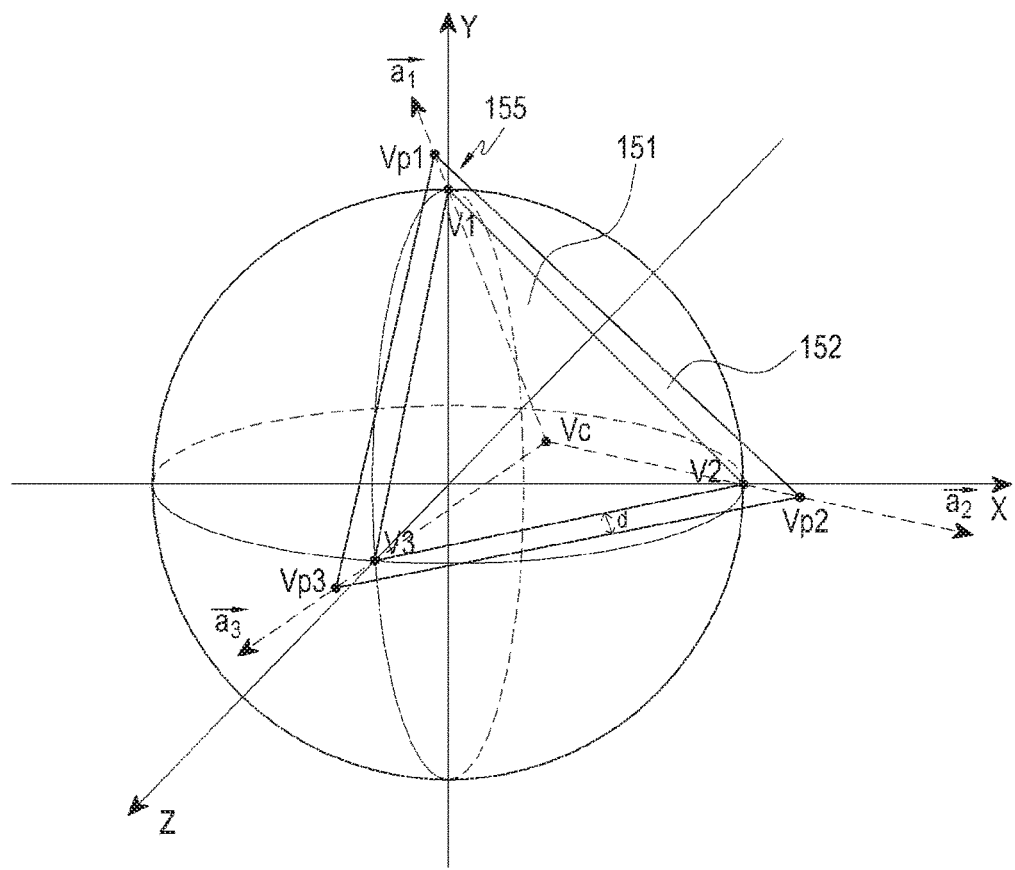
Figure 16C:
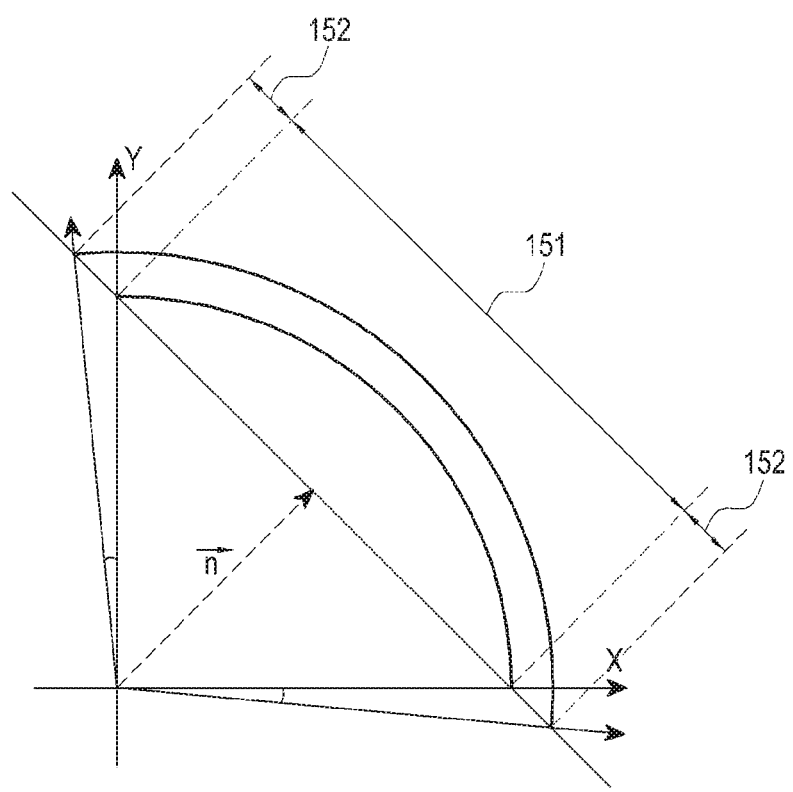

FIG. 16A to FIG. 16C illustrate a method of setting pixel values for padding areas according to an embodiment of the present disclosure.

Specifically, FIG. 16A illustrates a method of setting a pixel value for a padding area 142 of an area 141 of a two-dimensional image.

Referring to FIG. 16A, the padding area 142 may set a pixel value of other areas 143-1 to 143-12 adjacent to one area 141 as a pixel value of the padding area 142. In FIG. 16A, although other areas 143-1 to 143-12 adjacent to the periphery of the area 141 surround all the directions of the area 141, the disclosure is not limited thereto. For example, when the polyhedron is an octahedron, the octahedron does not include areas 143-1 to 143-12 adjacent to the area 141. Therefore, some areas 143-2 to 143-5, 143-7 to 143-9, and 143-11 to 143-1 of the areas 143-1 to 143-12 adjacent to the area 141 may not be referenced in determining the pixel value of the padding area 142.

FIG. 16B illustrates a method of setting the pixel value of the padding area 152 with respect to one face 151 of an octahedron. Here, the padding area 152 has the same normal vector as the face 151.

Referring to FIG. 16B, a padding area 152 is set. Specifically, the center point Vc is calculated from vertices V1, V2, and V3 of the face 151 of the triangle. Vectors $\vec{a}_1, \vec{a}_2, \vec{a}_3$, directing from the center point Vc to the vertices V1, V2, and V3 of the one face 151, respectively, are calculated from the vertices V1, V2, and V3 of the center point Vc and the face 151. When the width of the padding area 152 is set to d, a triangle 155 extended by d is set. The normal vector ($\vec{n}$) is perpendicular to the triangle face, since it is directed from the origin to the center point Vc. When the vertices of the extended triangle 155 from one face 151 of the triangle are Vp1, Vp2, and Vp3, the direction of the vector, directing from the center point Vc to the vertices Vp1, Vp2, and Vp3 and the direction of the vectors $\vec{a}_1, \vec{a}_2, \vec{a}_3$ are the same, but the magnitude thereof is different.

FIG. 16C illustrates a plane view of FIG. 16B with respect to X-Y axis. Referring to FIG. 16C, the normal vector ($\vec{n}$) for one face 151 of the triangle and the padding area 152 are the same.

When the padding area 152 is set, a pixel value may be set in the padding area 152. For example, the corresponding pixel value of the spherical coordinate when the padding area 152 in which one face 151 of the triangle extends is viewed from an origin may be set as a pixel value of the padding area 152. Therefore, the spherical area corresponding to one face of the triangle including the padding area 152 is wider than the spherical area corresponding to one face 151 of the triangle. In addition, one face of the triangle 151 is the same as one face of the triangle including the padding area 152, and spherical areas corresponding to angles that increase over the X axis and the Y axis in the drawing are further included such that the spherical areas are projected into the padding area 152 and mapped thereto. As a result, the padding area 152 of each triangle includes an image which is obtained by projecting and mapping an image on a spherical surface corresponding to a partial area of an adjacent triangle.

As another example, the pixel value of one face 151 of the triangle may be set as the pixel value of the padding area 152.

As another example, a value obtained by interpolating the pixel value of one face 151 of the triangle may be set as the pixel value of the padding area 152.

As described above, by using the OHP to map the omnidirectional image to the two-dimensional image, the load within an image processing system that processes the omnidirectional image can be reduced, and a high QoS can be achieved while minimizing the use of bandwidth resources.

Figure 17:
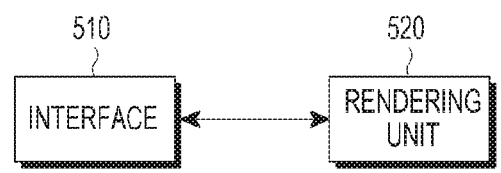
FIG. 17 illustrates an image processing apparatus according to an embodiment of the present disclosure.

FIG. 17 is a block diagram of an image processing apparatus according to an embodiment of the present disclosure.

Referring to FIG. 17, the image processing apparatus includes an interface 510 and a rendering unit 520.

The interface 510 outputs the input frame and metadata. The interface 510 may be a bus that transmits data between a decoding module and a rendering module. Alternatively, the interface 510 may be a network module that receives image data from an external electronic device. The interface 510 may include a communication module, e.g., an LTE communication module, a 3G communication module, a Wi-Fi module, a Bluetooth module, a millimeter wave (mm Wave) module, etc.

The rendering unit 520 may render an input frame as an output frame based on type information and subtype information included in the metadata.

The rendering unit 520 may determine the type of a polyhedron included in an output frame based on type information. The type information may include at least one among the type of the polyhedron associated with the output frame or the attribute information associated with each area included in the input frame. For example, when the polyhedron included in the output frame is an octahedron, the type information may be set as an indicator (e.g., "1") indicating the octahedron. When the polyhedron included in the output frame is a polyhedron with 20 faces, the type information may be set as another indicator (e.g., "2") indicating the polyhedron with 20 faces. Accordingly, the rendering unit 520 may determine whether the type of a polyhedron included in the output frame is an octahedron or a polyhedron with 20 faces based on type information.

The indicator indicating the polyhedron may be set including the shape of the figure and the number of faces of the polyhedron. For example, for an octahedron, the type information may include "8" and "equilateral triangle" indicating the octahedron.

The type information may include an indicator for indicating whether the image is stereoscopic (e.g., stereoscopic=true when the image is stereoscopic).

An indicator indicating the polyhedron may further include the inclination information of the polyhedron. For example, if the polyhedron has no tilt or rotation with respect to the X, Y, and Z axes, the orientation may be recorded in the metadata as type information such as "orientation=0, 0, 0". For example, when "orientation=90, 0, 0", this indicates that a polyhedron rotated at 90 degrees about the X axis. However, before determining the attributes of arrangement of a plurality of areas included in an input frame, a method of defining the attributes of each of the plurality of areas will be described. This definition may be determined, for example, when a transcoder generates metadata.

Specifically, an input frame includes a plurality of areas. The attributes of a plurality of areas included in an input frame are determined according to the attribute of the face of a polyhedron associated with an output frame. For example, the shape and number of a plurality of areas may be defined according to the shape of at least one face of, and the number of faces of, a polyhedron included in an output frame. Accordingly, a plurality of areas included in an input frame may be mapped to each face of a polyhedron included in an output frame. Each of the plurality of areas may be defined as relative positions within the coordinates or output frame.

The number of a plurality of areas included in an input frame is determined by the number of faces of a polyhedron included in the output frame. That is, in order for an input frame to include an image corresponding to all the faces of a polyhedron included in an output frame, the number of faces of a polyhedron included in an output frame must be considered.

Accordingly, the number of a plurality of areas included in the input frame may be equal to or greater than the number of faces of a polyhedron included in the output frame, and the shape of a plurality of areas included in the input frame may be the same as the shape of a polyhedron included in the output frame.

When the shape and number of a plurality of areas included in the input frame are determined, each of the plurality of areas can be numbered or indexed. Accordingly, the attributes of each of a plurality of areas included in the input frame can be defined.

Figure 18A:
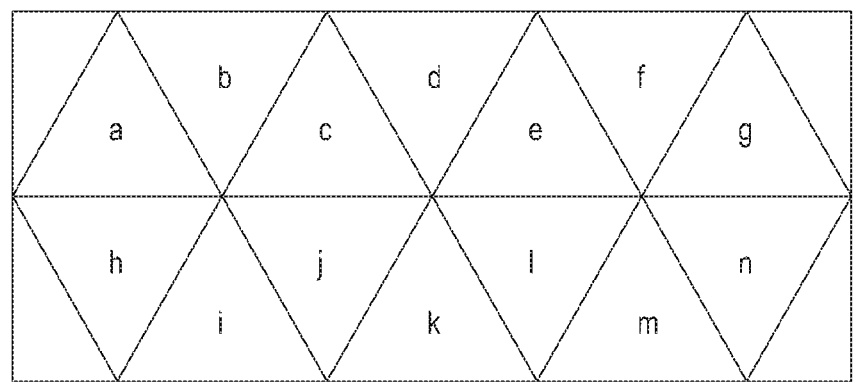
FIGS. 18A to 18C illustrate attributes of an arrangement of a plurality of areas of an input frame according to an embodiment of the present disclosure.
Figures 18B, 18C:
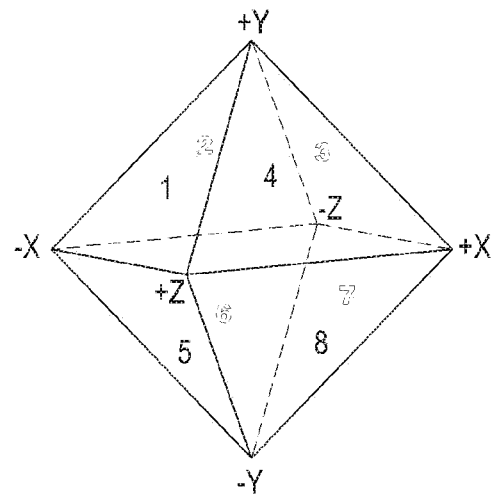

FIGS. 18A to 18C illustrate attributes of an arrangement of a plurality of areas of an input frame according to an embodiment of the present disclosure.

For example, FIG. 18A illustrates a polyhedron included in an output frame that corresponds to an octahedron, where a plurality of areas (a to n) included in an input frame are defined. A plurality of areas of the input frame are defined as an equilateral triangle shape because the face of the octahedron is an equilateral triangle, and are defined as eight or more areas because the number of faces of the octahedron included in the output frame is eight. In this case, each area of the input frame can be defined (numbered or indexed) as face a to face n from upper left side to the bottom right side. The subtype information can define attributes of arrangement of a plurality of areas included in the input frame based on the attribute of each of the plurality of areas included in the input frame. The subtype information may be index information indicating attributes of arrangement of a plurality of areas, or at least one of information on a number/index array order of each of a plurality of areas included in an input frame corresponding to the faces of a polyhedron corresponding to an output frame and information on an array direction of a plurality of areas, and may be orientation information of the plurality of areas.

The subtype information may be index information indicating attributes of arrangement of a plurality of areas included in the input frame. For example, each of the faces 1 to 8 of the octahedron included in the output frame of FIG. 18B corresponds to face a, face c, face e, face g, face h, face j, face l, and face n, as illustrated in the table of FIG. 18C.

In FIG. 18C, subtype index information included in the subtype included in the metadata is "17", and the attributes of arrangement of a plurality of areas corresponding to subtype index information "17" is the same as the content of the table of FIG. 18C.

Accordingly, the rendering unit 520 may determine the attributes of arrangement of a plurality of areas included in an input frame based on subtype index information included in subtype information.

The rendering unit 520 may map an area corresponding to each face of a polyhedron included in an output frame among the plurality of areas to the position of the respective faces of the polyhedron to perform rendering of the output frame, based on the attributes of arrangement of a plurality of areas of an input frame as described above.

For example, the rendering unit 520 may map face a of the input frame of FIG. 18A to face 1 of the polyhedron of FIG. 18B included in an output frame, the rendering unit 520 may map face c of the input frame of FIG. 18A to face 2 of the polyhedron of FIG. 18B included in an output frame, the rendering unit 520 may map face e of the input frame of FIG. 18A to face 3 of the polyhedron of FIG. 18B included in the output frame, the rendering unit 520 may map face g of the input frame of FIG. 18A to face 4 of the polyhedron of FIG. 18B included in the output frame, the rendering unit 520 may map face h of the input frame of FIG. 18A to face 5 of the polyhedron of FIG. 18B included in an output frame, the rendering unit 520 may map face j of the input frame of FIG. 18A to face 6 of the polyhedron of FIG. 18B included in an output frame, the rendering unit 520 may map face l of the input frame of FIG. 18A to face 7 of the polyhedron of FIG. 18B included in an output frame, and the rendering unit 520 may map face n of the input frame of FIG. 18A to face 8 of the polyhedron of FIG. 18B included in an output frame, so as to render the output frame of FIG. 18B.

The subtype index information may be differently specified based on attributes of a plurality of areas included in the input frame. For example, different index information can be set based on one input frame among the input frame sets 61-63, 71-72, 73, 81-84, and 93-96 and a certain mapping information corresponding to each face of an output frame.

The subtype information may include a number/index array order of each of a plurality of areas included in an input frame corresponding to the faces of a polyhedron corresponding to an output frame.

For example, when "order=a, c, e, g, h, j, l, n" is included in the subtype information, the subtype information refers an order of the respective areas in the input frame of FIG. 18A corresponding to the order of face 1 to face 8 of the output frame of FIG. 18B.

As another example, character strings such as "order=N, 5, 1, 6, 2, 7, 3, 4, N" may be included in order to correspond to the input frame of FIG. 10B, and character strings such as "order=8R, 1, 5, 2, 6, 3, 7, 4, 8L" may be included in order to correspond to the input frame of FIG. 11A. Here, N refers to "No Data".

Subtype information may include array direction information of a plurality of areas. For example, when "order=a, c, e, g, h, j, l, n" and "direction=Y: counter clock" is included in the subtype information, the subtype information indicates that each face of the input frame of FIG. 18A is mapped in the order of counterclockwise with reference to the Y axis from each face 1 of the output frame of FIG. 18B. Therefore, in this case, the rendering unit 520 may map face a of the input frame of FIG. 18A to face 1 of the output frame of FIG. 18B, the rendering unit 520 may map face c of the input frame of FIG. 18A to face 4 of the output frame of FIG. 18B, the rendering unit 520 may map face e of the input frame of FIG. 18A to face 3 of the output frame of FIG. 18B, the rendering unit 520 may map face g of the input frame of FIG. 18A to face 2 of the output frame of FIG. 18B, the rendering unit 520 may map face h of the input frame of FIG. 18A to face 5 of the output frame of FIG. 18B, the rendering unit 520 may map face j of the input frame of FIG. 18A to face 8 of the output frame of FIG. 18B, the rendering unit 520 may map face l of the input frame of FIG. 18A to face 7 of the output frame of FIG. 18B, and the rendering unit 520 may map face n of the input frame of FIG. 18A to face 6 of the output frame of FIG. 18B, so as to render the output frame of FIG. 18B.

The subtype information may include orientation information of the plurality of areas. For example, as illustrated in FIG. 9, the degree of rotation of the upper part faces and lower part faces may be displayed, respectively. That is, in FIG. 9, because the upper part does not rotate and the lower part rotates 90 degrees in a clockwise, and the sub type information may include rotation information such as "Shift=Upper: 0, Lower: 90".

As another example, orientation information may be designated for each of the plurality of areas. For example, the plurality of areas may include rotation angular information such as "face orientation=a: 0" in order to display face a of the input frame of FIG. 18A, and rotation angular information such as "equilateral_triangle_orientation=CW120 (or CCW240)" in order to display face 5, which is a right triangle rotated in a clockwise direction by 120 degrees (i.e., counterclockwise 240 degrees) in the input frame of FIG. 10C.

The subtype information may include shearing information of the plurality of areas. For example, when the input frame of FIG. 9 is deformed through shearing as in the input frame of FIG. 12C, subtype information such as "order=8R, 1, 5, 2, 6, 3, 7, 4, 8L; shearing=true" or "Shift=Upper: 0, Lower: 90; shearing=true" may be included.

When the type information included in the metadata displays a plurality of polyhedrons (e.g., stereoscopic images), the attributes of arrangement of a plurality of areas associated with each of the polyhedrons included in an input frame can be determined using the subtype information of the metadata. For example, the subtype information may further include arrangement related information (e.g., at least one of "side-by-side", "top-down", and "mixed") of the left eye and right eye images included in an input frame.

The subtype information of the metadata may include a plurality of combinations. For example, because the input frame of FIG. 13B is a stereoscopic image (e.g., "TYPE: stereoscopic=true"), and a plurality of areas included in the right-eye image thereof are all vertically inverted, in order to represent the same, subtype information may include character strings such as "SUBTYPE: stereoscopic_order=top-down; order=8R, 1, 5, 2, 6, 3, 7, 4, 8L; Mirroring=top-down", or may include a number or symbol corresponding thereto.

In the example described above, all of the faces of the input frame of FIG. 18A are mapped corresponding to the faces of the polyhedron of FIG. 18B included in the output frame, but the present disclosure is not limited thereto. For example, rendering may be performed by selecting some of the faces of the input frame of FIG. 18A and mapping the same to some of the faces of the polyhedron of FIG. 18B included in the output frame.

The rendering unit 520 may further use matching information on the plurality of areas and faces of a polyhedron in order to map each of the plurality of areas of the input frame to each face of the polyhedron included in the output frame. In this case, the matching information may be included in the metadata. The matching information may be an OBJ file format (OBJ geometry definition file format). The OBJ file format is a simple data-format that represents 3D geometry alone. The OBJ file is a file of a three-dimensional model data format and includes mapping coordinates. The OBJ file is well known to those skilled in the art of technical field of the present disclosure, and a detailed description thereof will be omitted.

The mapping information may have different information according to the subtype information because the shape and number of the plurality of areas included in the input frame may differ depending on the type of the polyhedron included in the output frame.

The rendering unit 520 may determine positions and directions in which a plurality of areas of the input frame are mapped to respective faces of the polyhedron included in the output frame based on the matching information. Specifically, the rendering unit 520 may determine the position and direction matched to each face of the polyhedron based on information on the first coordinates indicating the position of each vertex of the polyhedron, information on the second coordinates indicating positions of vertices of each of the plurality of areas, and mesh information indicating the corresponding relationship between the first coordinates and the second coordinates. The information on the first coordinates and second coordinates and the mesh information may be included in the matching information.

FIG. 19A to 19D illustrate a rendering method according to an embodiment of the present disclosure.

Figure 19A:
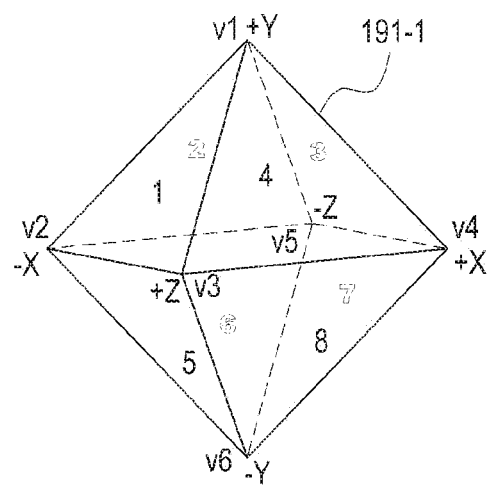

FIG. 19A illustrates a coordinate system (i.e., a coordinate system with respect to a first coordinate) of an octahedron included in an output frame. For example, the coordinates of the vertex V1 of the octahedron 191-1 may be described as (v1.x, v1.y, v1.z).

Figure 19B:
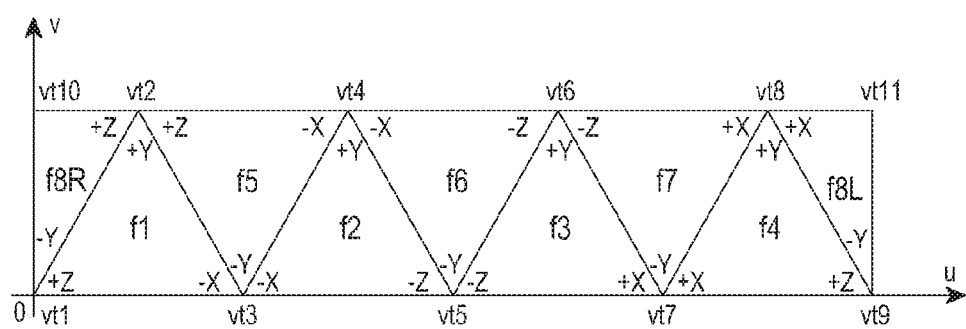

FIG. 19B illustrates a coordinate system (i.e., a coordinate system for the second coordinates) for each of a plurality of areas f1, f2, f3, f4, f5, f6, f7, f8L, and f8R included in the input frame. For example, the coordinates of the vertex vt1 of the area f1 may be described as (vt1.u, vt1.v).

FIG. 19C illustrates mesh information between the octahedral coordinate system of FIG. 19A and the coordinate system for the plurality of areas of FIG. 19B. For example, the vertices of face 1 of the octahedron of FIG. 19A are v1, v2, and v3. In addition, the vertices of the area f1 of the input frame of FIG. 19B corresponding to the face 1 of the octahedron are vt1, vt2, and vt3. The corresponding relationship there between are the same as v1/vt2, v2/vt1, and v3/vt3, as illustrated in FIG. 19C.

Type information and subtype information of the metadata may be determined based on mesh information of FIG. 19C. For example, in the mesh information, there are three vertices associated with f1, and the number of f is eight. Accordingly, a polyhedron associated with the output frame is an octahedron including triangular faces. That is, the information included in the type information of the metadata includes eight faces, and the shape of the face is identified as a triangle. In addition, as subtype information, the attributes of arrangement (e.g., the order and shape of a face) of a plurality of areas included in the input frame may be determined based on the information and order of the positions vt of the vertices on the input frame based on each face f. In addition, even when a predetermined face f in the input frame is top-down mirrored or rotated, since the vertex of the input frame of FIG. 19B and the vertex of the octahedron of FIG. 19A are associated with each other 1:1 in relation to information on face f1 information included in the mesh information of FIG. 19C, mapping can be performed such that it is transformed to fit the output frame when performing rendering.

FIG. 19D illustrates a data sheet in which the above-described example corresponds to actual data values.

Referring to FIG. 19D, 7 vertex positions indicate the coordinates of the each of the vertices of the octahedron 191-1. For example, the values of the x-coordinate and z-coordinate of the vertex V1 of the octahedron 191-1 is defined as "0", and the y-coordinate value is defined as "100". In addition, the UV coordinates indicate the coordinates of the vertex of the input frame of FIG. 19B, e.g., the coordinate value of vt2 is (0.125, 0). The coordinate value of vt10 is defined as (0, 0), and the distance between vt10 and vt2 in the u-axis direction is 0.125. In addition, mesh information indicates the relationship between 7 vertex positions and UV coordinates. For example, #1 in the 7 vertex positions and #1 in the UV coordinates correspond to each other, #2 in the 7 vertex positions and #5 in the UV coordinates correspond to each other, and #3 in the 7 vertex positions and #6 in the UV coordinates correspond to each other (1/1, 2/5, 3/6).

Accordingly, the coordinates of the vertices of the each face included in the octahedron 191-1 and the coordinates of the vertices of the plurality of areas included in the input frame of FIG. 19B and the mesh information for the coordinates of the vertices of the each face included in the octahedron 191-1 and the coordinates of the vertices of each of the plurality of areas included in the input frame of FIG. 19B are used together so that the position and direction for mapping each of the faces included in the octahedron 191-1 and the plurality of areas included in the input frame of FIG. 19B can be determined. The rendering unit 520 maps the plurality of areas of the input frame of FIG. 19B to the positions of each face of the octahedron 191-1, based on the determined position and direction.

As described above in relation to the transmitting unit, the plurality of areas of the input frame may include a padding area. Accordingly, the rendering unit 520 may render an area where one face and other face of the polyhedron meet, based on the image of the padding area. Specifically, the rendering unit 520 may set a result value obtained by interpolating the pixel value of the padding area as the pixel value of the boundary (or corner) portion shared by each of the polyhedrons included in the output frame. For example, two adjacent faces may be interpolated based on the pixel information included in each padding area, thereby changing the color or brightness information of the boundary or the adjacent area of the two faces. The boundary between the two faces are stitched based on the image processing (edge, boundary extraction, connection, etc.) using the pixel information included in each padding area, in order to compose two faces into one image.

The image processing apparatus may additionally receive an instruction on whether to perform rendering of a three-dimensional image.

For example, when metadata further includes attribute information of an input frame, the rendering unit 520 may determine whether to perform rendering of the three-dimensional image based on the attribute information of the input frame. Specifically, when the attribute information of the input frame corresponds to a rendering instruction for a three-dimensional image, the rendering unit 520 may render the input frame to an output frame based on the type information and subtype information. However, when the attribute information of the input frame does not correspond to the rendering instruction for the three-dimensional image, the input frame may be mapped to the two-dimensional plane so as to perform rendering thereof. Since the attribute information of the input frame indicates whether rendering for the three-dimensional image is performed, the image processing apparatus may render only the two-dimensional image, which can be rendered to the three-dimensional image, to the three-dimensional image.

According to another embodiment, when the metadata further includes information on an area in which rendering is to be performed, as attribute information of the input frame, the rendering unit 520 may determine an area in which rendering of the three-dimensional image is to be performed, based on the attribute information of the input frame. That is, some of the areas included in the input frame may not be rendered even if the areas are associated with the face of the output frame. For example, when the photographing in some directions may not be performed due to a sensor failure or power control, in a camera including a plurality of lenses or image sensors for photographing an omnidirectional image, or when a camera, a transcoder 420, or a rendering unit 520 detects that there is no change in the image in some direction, the camera may include such situation information in the metadata and transmit the same. The rendering unit 520 that received the metadata may determine, based on the metadata, an image corresponding to the direction in which the image has not been photographed and an image corresponding to the direction in which there is no change. Accordingly, the rendering unit 520 may not render the image corresponding to the direction in which the image has not been photographed and the image corresponding to the direction in which there is no change.

Figure 20:
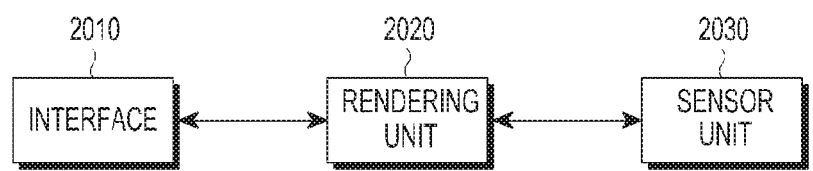
FIG. 20 illustrates an image processing apparatus according to an embodiment of the present disclosure.

FIG. 20 illustrates an image processing apparatus in an image processing system according to an embodiment of the present disclosure.

Referring to FIG. 20, the image processing apparatus includes an interface 2010 a rendering unit 2020, and a sensor unit 2030. The operations of the interface 2010 and the rendering unit 2020 are the same as those of the interface 510 and the rendering unit 520 of FIG. 17. Accordingly, repetitive descriptions of the interface 2010 and the rendering unit 2020 will be omitted.

The sensor unit 2030 senses the direction of a user's line of sight. The sensor unit 2030 may include a camera module.

Figure 21:
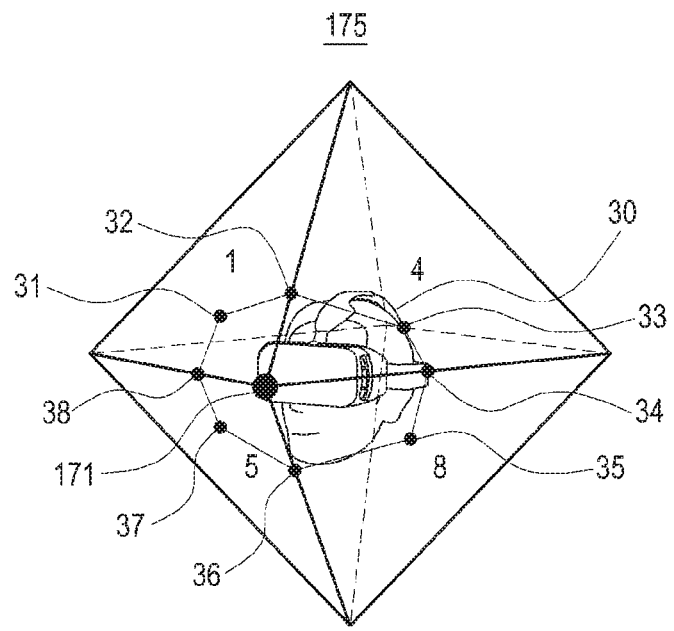
FIG. 21 illustrates a rendering method of an image processing system according to an embodiment of the present disclosure.

For example, referring to FIG. 21, a pupil of a user 30 can be tracked using a camera sensor. As another example, the iris and pupil may be sensed using an infrared (IR) sensor. The sensor unit 2030 senses the user's motion. To this end, the sensor unit 2030 may include at least one of a camera module, an accelerometer sensor, and a gyro sensor. For example, the motion of the user's head or hand may be sensed through an HMD, a remote controller, an accelerometer sensor, and/or a gyro sensor mounted on a mobile device.

The rendering unit 2020 may determine an FOV based on the sensed direction of the line of sight, the user's motion, or the user input (e.g., touch on a touch display, a pressure sensor, a gesture input, a joystick, and a button). In this case, the rendering unit 2020 may perform rendering of an image of an area corresponding to the FOV.

For example, referring to FIG. 21, the rendering unit 2020 may determine that the user 30 is gazing at the direction of point of intersection 171 of face 1, face 4, face 5, and face 8 of the octahedron based on the sensed direction of line of sight, the user's motion, or the user input. Accordingly, the rendering unit 2020 may perform rendering of an area corresponding to a predetermined FOV around the point of intersection 171.

The FOV area may be defined as included in areas (face 1, face 4, face 5, and face 7) of the octahedron included in a certain angle based on the gaze vector (direction toward the point 171 from the eye of the user 30) of the user 30. In this case, the area on the octahedron in the FOV area is, in the case of face 1, a quadrangle on face 1 on which the vertices are formed by the points 31, 32, 171 and 38, and may be defined as a quadrangle having vertices of the points 32, 33, 34, and 171 in the case of face 4, the points 34, 35, 36, and 171 in the case of face 8, and as a quadrangle having vertices of the points 36, 37, 38, and 171 in the case of face 5. The rendering unit 2020 may perform rendering only of some areas (e.g., areas in which the rectangles are included) of the input frame including the areas on the four faces (face 1, face 4, face 5, face 8) corresponding to the FOV in the input frame in FIG. 21.

In the examples described above, the rendering unit 2020 performs rendering only of a predetermined FOV area, not on an area corresponding to the entire of the octahedron, thereby achieving high rendering efficiency.

In addition, the rendering unit 2020 may further use the position information of the user 30 as well as information on the user's line of sight. In this case, the position information of the user 30 may be set to any position inside or outside the space of the octahedron other than the center of the octahedron. Accordingly, the position and size of the area included in the FOV may be adjusted to control zoom in, zoom out, out focus, transparency (alpha blending) adjusting effect, etc.

In the examples described above, the rendering may be an operation of mapping, to a two-dimensional image, at least a part of the polyhedron to which an image is mapped. For example, rendering may include the processes of texturing at least a part of the polyhedron to which the image is mapped, providing a light source effect, etc. As another example, the rendering may be a process of texturing and displaying on the display, for at least a part of the polyhedron to which the image is mapped.

The rendering unit 2020 may perform an operation of mapping to an output frame, and further include an operation of displaying in order to match the display characteristics. That is, in order to display an image on an image output device according to characteristics of the display or characteristics of contents, an image may be converted to a two-dimensional image suitable for a display view and transmitted to a display buffer or a graphic frame buffer, or a stereo image may be generated and transmitted to a different area on the display or a different image output device. The characteristics of the display may be the resolution of the display, the size of the display, etc.

Figure 22:
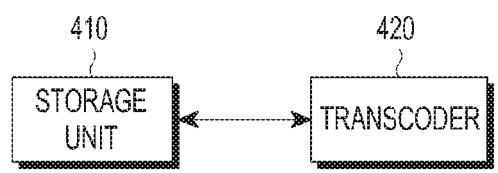
FIG. 22 illustrates an image processing apparatus according to an embodiment of the present disclosure.

FIG. 22 is a block diagram of an image processing apparatus 400-1 according to various embodiment of the present disclosure. Here, the detailed description of the parts overlapping with the content described above will be omitted.

Referring to FIG. 22, the image processing apparatus includes a storage unit 410 and a transcoder 420. In FIG. 22, an input frame is a frame input to the transcoder 420, and an output frame is defined as a frame, which is obtained by processing the input frame by the transcoder 420.

The storage unit 410 stores the input frame.

The transcoder 420 may generate metadata including predetermined type information and predetermined subtype information, generate an output frame based on the input frame, predetermined type information, and predetermined subtype information, and store the metadata and the output frame in the storage unit 410. The transcoder 420 may determine the type of a polyhedron included in the input frame based on the predetermined type information, determine the attributes of arrangement of a plurality of areas included in the output frame based on the predetermined subtype information, and map the input frame to the output frame based on the type of the polyhedral and the attributes of arrangement of the plurality of areas, in order to generate an output frame.

The plurality of areas included in the output frame may be divided based on the shape determined according to the shape of at least one face of the polyhedron and the number determined according to the number of faces of the polyhedron, and the attributes of arrangement of a plurality of areas may define the arrangement of the plurality of areas in the output frame.

The number of the plurality of areas may be equal to or greater than the number of the faces of the polyhedron, and the shape of the plurality of areas may be the same as the shape of at least one face of the polyhedron. For example, a polyhedron may be a regular polyhedron.

The transcoder may further include matching information including positions and directions in which a plurality of areas are mapped to respective faces of the polyhedron, in order to generate metadata.

The matching information includes information on the first coordinates indicating a position of each vertex of the polyhedron, information on the second coordinates indicating positions of vertices of each of the plurality of areas, and mesh information indicating the corresponding relationship between information on the first coordinates and information on the second coordinates.

At least one area among the plurality of areas may include a padding area including surplus image information.

Figure 23:
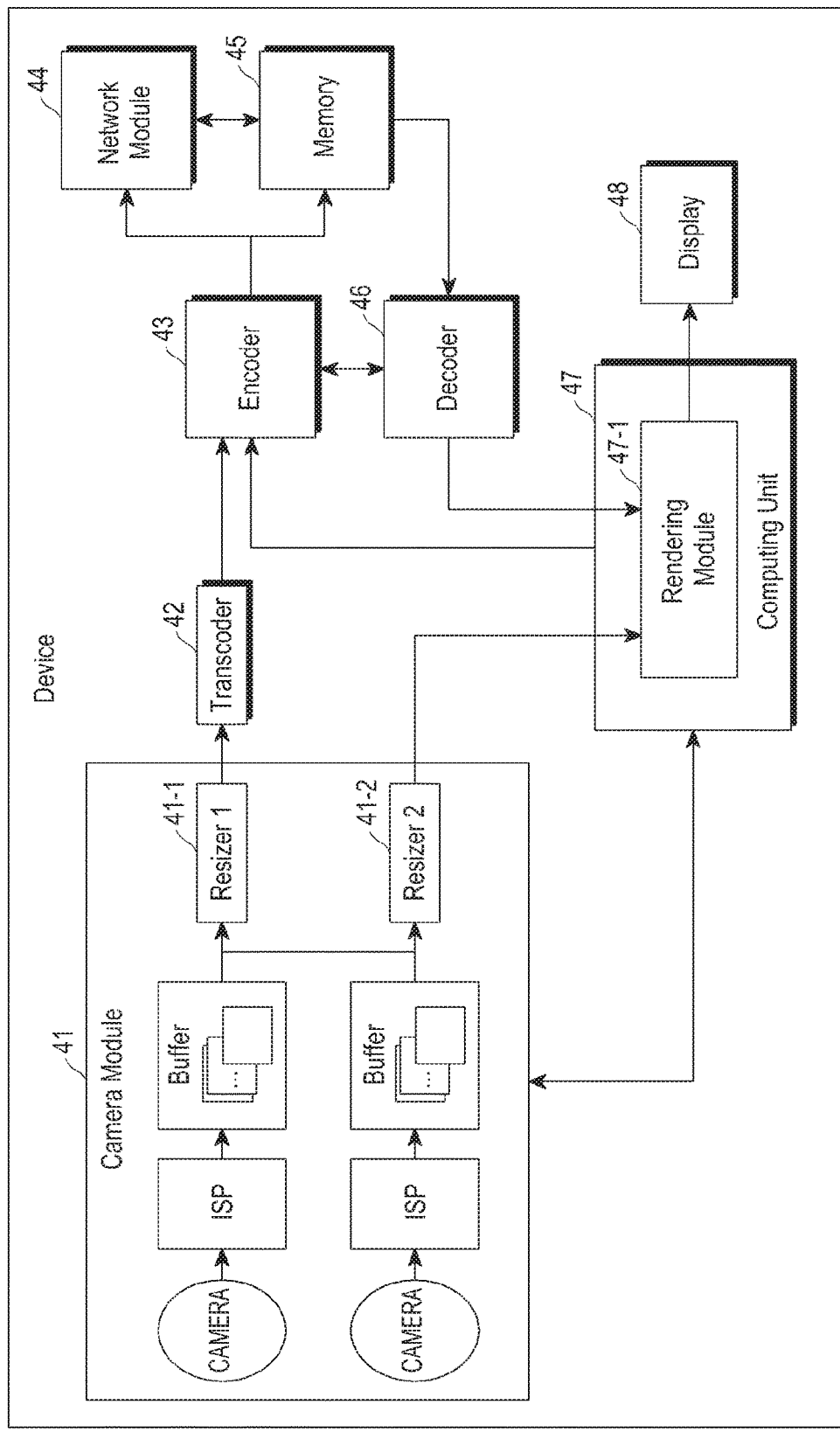
FIG. 23 illustrates an image processing apparatus according to an embodiment of the present disclosure.

FIG. 23 illustrates an image processing system according to an embodiment of the present disclosure.

Referring to FIG. 23, the image processing system is implemented as a single device (or image processing apparatus).

For example, the camera module 41 photographs an omnidirectional image. The photographed image is transmitted to a resizer 1 41-1, which outputs an omnidirectional image to a transcoder 42. The transcoder 42 maps an omnidirectional image to a two-dimensional image using OHP, and transfers the same to the encoder 43. The encoder 43 transfers the mapped two-dimensional image to a network module 44 and/or a memory 45. The decoder 46 decodes the two-dimensional image stored in the memory 45 and transfers the same to a rendering module 47-1 of a computing unit 47. The rendering module 47-1 (or the computing unit 47) transfers the rendered image to a display 48, which displays the rendered image. A resizer 2 41-2 adjusts the size of the omnidirectional image and transfers the same to the rendering module 47-1, to provide a preview.

The rendered image and the preview image may be displayed together on the display 48, e.g., using picture-in-picture or picture-by-picture schemes).

The rendered image and the preview image may be independently displayed on different displays. For example, an image on a fisheye image photographed through a fisheye lens may be previewed on a first display, and the rendered image may be displayed on a second display.

An area of the omnidirectional image corresponding to the preview area may be determined, and an image rendered in association with the area may be displayed on the display 48.

The preview area may be set to an FOV, and an image on the area of the omnidirectional image related to the corresponding FOV may be rendered and displayed on the display.

The rendering module 47-1 (or the computing unit 47) may adjust the size of only images received from a predetermined camera among a plurality of cameras included in the camera system, which photographs an omnidirectional image, and then provide the same as a preview image.

The resizer 2 41-2 may detect the occurrence of an event, and based on the occurrence, specify some areas of the omnidirectional image, adjust the size of the areas, and provide the same as a preview image.

For example, the rendering module 47-1 (or the computing unit 47) may set the FOV area of the omnidirectional image based on the orientation of the display 48 (e.g., direction pointing to display or opposite direction thereof) and provide the same as a preview image. When the preview direction is set by the user input (e.g., touch, gesture, voice input, etc.) in the same direction as the display, selfie photographing operation to be included in the omnidirectional image and confirmation of the result are facilitated.

When the motion of the apparatus is detected, the FOV area may be changed based on the detection. For example, the rendering module 47-1 (or the computing unit 47) may determine the directionality of an audio when the audio input is generated, and set the FOV area of the omnidirectional image, based on the direction in which the corresponding audio input is generated (e.g., one or more microphones adjacent to the direction in which the audio is input among the plurality of microphones mounted on the apparatus are determined based on the sound volumes received from the respective microphones), to provide the same as a preview image. The rendered image and the preview image may be independently displayed on different displays.

Figure 24:
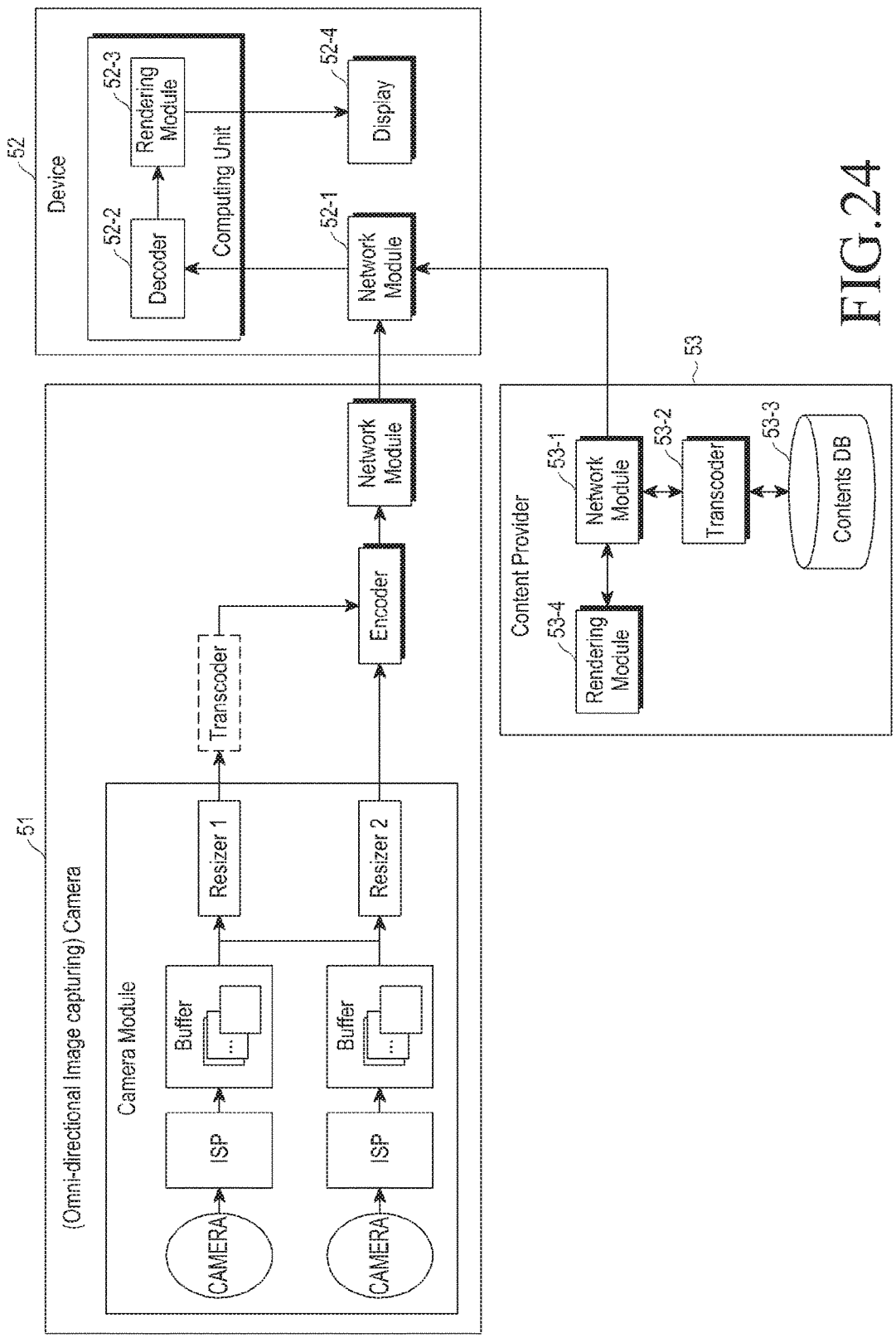
FIG. 24 illustrates an image processing apparatus according to an embodiment of the present disclosure.

FIG. 24 illustrates an image processing system according to an embodiment of the present disclosure.

Referring to FIG. 24, the image processing system includes a camera 51, a device 52, and a content provider 53. Here, the detailed description of the configuration overlapping with FIG. 23, e.g., the camera module, will be omitted.

The camera 51 transmits, to the device 52, a two-dimensional image to which an omnidirectional image is mapped. The device 52 receives the two-dimensional image through the network module 52-1. The received two-dimensional image is transferred to a decoder 52-2. The decoder 52-2 transmits the decoded two-dimensional image to a rendering module 52-3. The rendering module 52-3 performs rendering based on the two-dimensional image and transfers the rendered image to a display 52-4. The display 52-4 displays the rendered image.

The device 52 may also be provided with the mapped two-dimensional image from the content provider 53. For example, the transcoder 53-2 of the content provider 53 may map the omnidirectional image loaded from a content data base (DB) 53-3 (or storage) to the two-dimensional image (here, it is assumed that a decoding process of the omnidirectional image is performed). The network module 53-1 may transfer the mapped two-dimensional image to the rendering module 53-4 or transmit to the network module 52-1 of the device 52. The rendering module 53-4 may render a two-dimensional image using three-dimensional image data. For example, when a game is provided as a three-dimensional image, the rendering module 53-4 may map a three-dimensional image to a two-dimensional image using an OHP method according to a predetermined event (e.g., a user's input), to perform rendering thereof.

The camera 51 may further include a display for displaying a preview. The device 52 may include a plurality of displays. The method of displaying the preview and rendered image may be implemented by using various combinations of the camera 51 and the device 52. For example, the camera 51 and the device 52 may display the same image (e.g., preview and rendered image) or different images. In addition, two of the images may be also displayed together on one display.

The images may be displayed in different methods depending on the FOV setting. For example, when the FOV is set by the device 52, the FOV is transferred to the camera 51 through the network module 52-1, and accordingly, the omnidirectional image related to the FOV is transferred through the network module 52-1 to the device 52 and then displayed. In relation to the preview, both devices may display the area related to the FOV or each device may independently display the same. In relation to the FOV, multiple devices may set different FOVs for one omnidirectional image, thereby rendering areas related to different areas. For example, a plurality of devices may request, from the content server, different FOV settings by the user input, the user's line of sight, the user motion, and the audio input. As another example, the camera may independently set different FOVs based on events.

As another example, when a plurality of FOVs are set, an FOV requested by each device may be processed and then a preview or a rendered image may be transmitted in response to each device which has requested the FOV.

As another example, when the FOV is not set, the identifier or the number of a predetermined face previously designated as the front may be received or predetermined direction information may be received from the metadata, and the same may be used during the minimum rendering. The user input for the FOV setting or the event-based processing method is similar to the method described in FIG. 23, so a detailed description thereof will be omitted. For example, event detection devices such as a microphone, a motion sensor, and the like described in FIG. 23 may be located in at least one of the camera 51 and the device 52.

Content stored in the content DB 53-3 may be a unique image (e.g., a fisheye image, a 2D image, etc.) photographed by a camera, an ERP image, or may be other images stored in other polyhedron (tetrahedron, dodecahedron, icosahedron, etc.) formats.

Content stored in the content DB 53-3 may control the transcoder 53-2 based on the state of the device 52, obtained through the network modules, to determine the attribute of the two-dimensional images to be transmitted, and generate metadata. For example, the output frame information and network information (e.g., bandwidth, drop rate, network module performance, QoS, etc.), supported by the rendering module 52-3 included in the device 52, a supported resolution, image processing performance, heat generation state (temperature sensor), or the polyhedron type selection information by user input may be received by the content provider 53. Metadata (e.g., including one or more of the type and size of a polyhedron, image resolution, number of faces, size of face, and packed type) may be determined based on the state information, and the image may be transcoded based on the determined metadata. The transcoded two-dimensional image may be encoded through a codec, and then the encoded data may be transferred through the network module 53-1 to the device 52. The metadata may be included in the encoded data or separately transmitted.

The device 52, which has received the encoded data through the network module 52-1, decodes the encoded data into a two-dimensional image through the decoder 52-2, renders the same based on the metadata that has received from the rendering module 52-3, and converts the rendered image to fit the display view, to output the converted image to the display.

Figure 25:
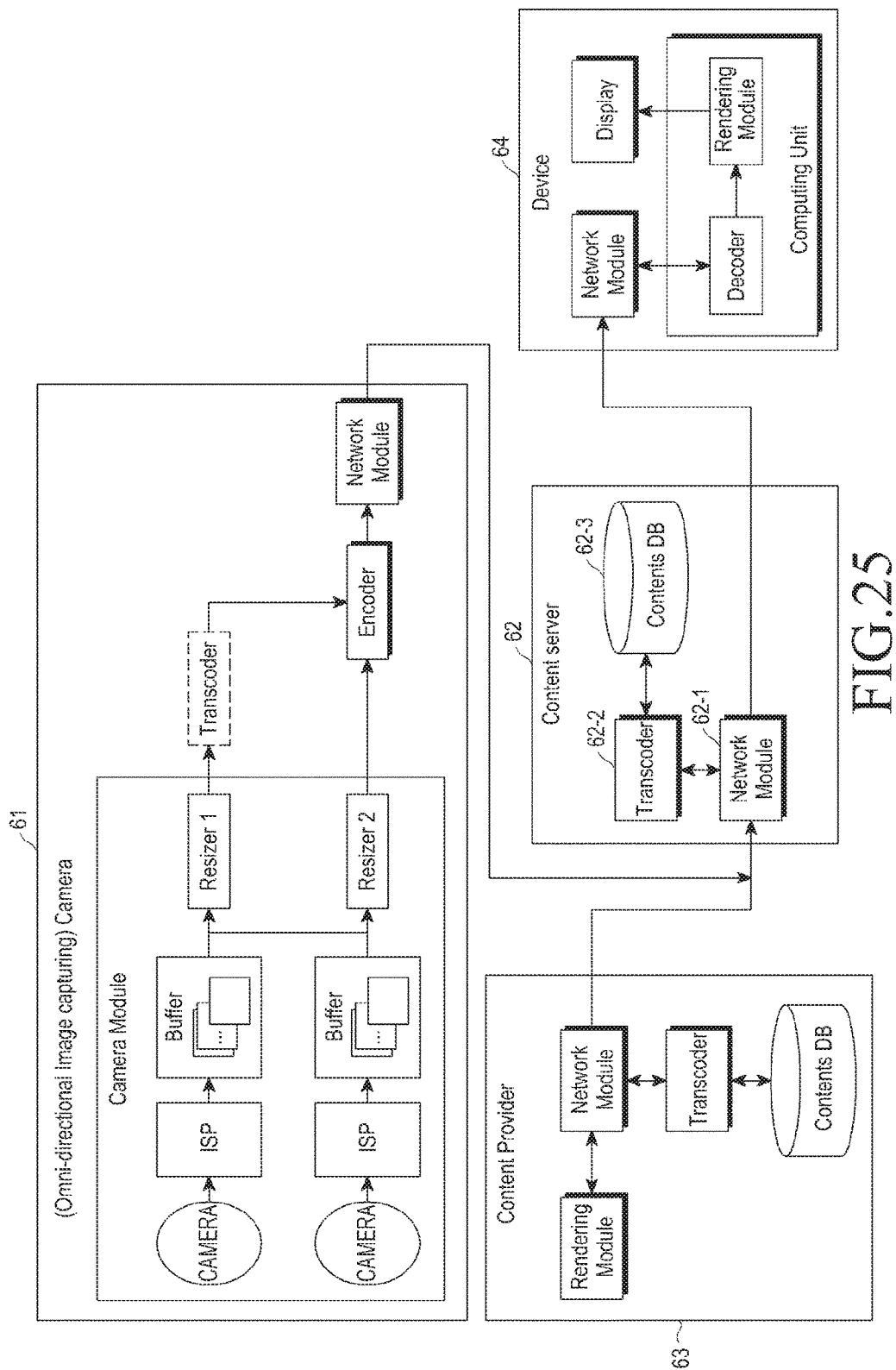
FIG. 25 illustrates an image processing system according to an embodiment of the present disclosure.

FIG. 25 illustrates an image processing system according to an embodiment of the present disclosure. Detailed descriptions of configurations overlapping with FIG. 22 and FIG. 23 will be omitted.

Referring to FIG. 25, the image processing system includes a camera 61, a content server 62, a content provider 63, and a device 64.

The camera 61 photographs an omnidirectional image. The camera 61 may map the photographed omnidirectional image to a two-dimensional image, and may transmit the mapped two-dimensional image to the content server 62. The content provider 63 may also transmit the mapped two-dimensional image to the content server 62. The network module 62-1 of the content server 62 receives the mapped two-dimensional image from the camera 61 or the content provider 63. The network module 62-1 may store the mapped two-dimensional image in a content data DB 62-3.

Alternatively, a transcoder 62-2 receives an omnidirectional image provided from the content DB and maps the same to a two-dimensional image (here, it is assumed that a decoding process of the omnidirectional image has performed).

The network module 62-1 transmits, to the device 64, the mapped two-dimensional image received from the transcoder 62-2. The device 64 may perform rendering based on the received two-dimensional image and display the rendered image.

Since the above-described embodiments of the image processing apparatus and the image processing system perform encoding and decoding of the mapped two-dimensional image using an OHP method, a greater efficiency can be achieved in the image processing process.

Figure 26:
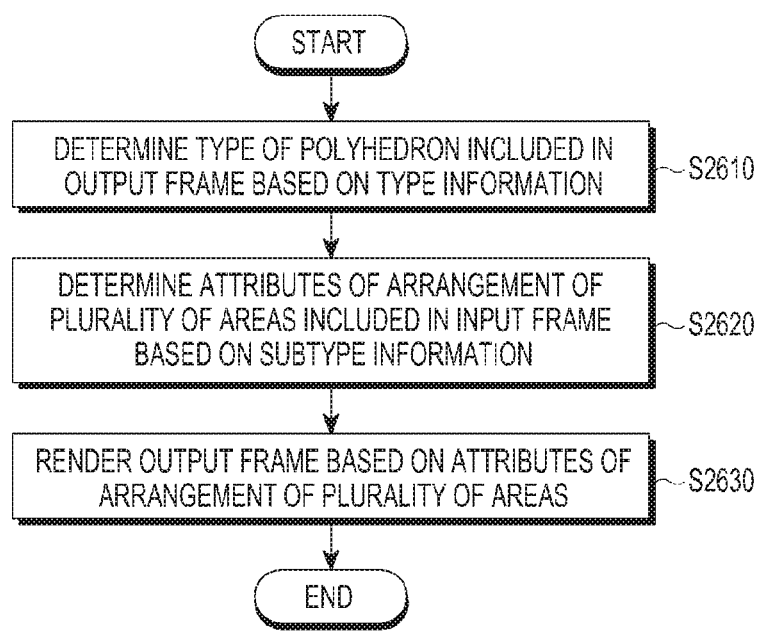
FIG. 26 is a flow chart illustrating an image processing method according to an embodiment of the present disclosure.

FIG. 26 is a flowchart illustrating an image processing method according to an embodiment of the present disclosure.

Referring to FIG. 26, the image processing method determines a type of a polyhedron included in an output frame based on type information in step S2610, determines the attributes of arrangement of a plurality of areas included in an input frame based on the subtype information in step S2620, and maps, to a corresponding face of the polyhedron, each of areas corresponding to faces of the polyhedron, among the plurality of areas, based on the attributes of arrangement of the plurality of areas, to render the output frame in step S2630.

The plurality of areas included in the input frame may be divided based on the shape determined according to the shape of face of the polyhedron and the number determined according to the number of faces of the polyhedron, and the attributes on the arrangement of the plurality of areas may define the arrangement of the plurality of areas in the input frame.

The number of the plurality of areas may be equal to or greater than the number of the faces of the polyhedron, and the shape of the plurality of areas may be the same as the shape of the face of the polyhedron.

When the polyhedron is an octahedron, the number of the plurality of areas may be eight or more, and the shape of the plurality of areas may be an equilateral triangle.

The metadata may also include matching information, and the rendering of the output frame may include determining positions and directions in which a plurality of areas are mapped to respective faces of a polyhedron based on the matching information, and mapping the plurality of areas to each face of the polyhedron based on the determined positions and directions.

In addition, determining the positions and directions may determine the position and direction matched to each face of the polyhedron based on information on the first coordinates indicating a position of each vertex of the polyhedron, information on the second coordinates indicating positions of vertices of each of the plurality of areas, and mesh information indicating the corresponding relationship between information on the first coordinates and information on the second coordinates. The information on the first coordinates and second coordinates and the mesh information may be included in the matching information.

At least one area among the plurality of areas may include a padding area, and the rendering of the output frame may include rendering a boundary between one face of the polyhedron mapped to at least one area and other face adjacent to one face, based on the surplus image information of the padding area.

The rendering of the output frame may include determining an FOV based on the direction of the user's line of sight, and may include performing rendering on an image of an area corresponding to the FOV among the output frame.

An image processing method according to an embodiment of the present disclosure, as described above, may be provided to each server or device such that the image processing method is implemented as a computer-executable program code and executed by a processor while being stored in various non-transitory computer readable media.

For example, a non-transitory computer-readable medium in which a program for performing operations is stored may be provided, wherein the operations include determining a type of a polyhedron included in an output frame based on type information; determining the attributes of arrangement of a plurality of areas included in an input frame based on subtype information; and mapping, to a corresponding face of the polyhedron, each of areas corresponding to faces of the polyhedron, among the plurality of areas, based on the attributes of arrangement of the plurality of areas, to render the output frame.

The non-transitory computer-readable medium refers not to a medium that stores data for a short period of time, such as a register, cache, memory, etc., but to a medium that semi-permanently stores data and is readable by the device. Specifically, various applications or programs described above may be stored and provided on a non-transitory computer-readable media such as CD, DVD, hard disk, Blu-ray disk, USB, memory card, ROM, etc.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An image processing apparatus, comprising:
an interface; and
a processor configured to:
receive, through the interface, an input frame including a plurality of areas and metadata related to an output frame corresponding to the input frame, the metadata including type information indicating a type of a polyhedron for the output frame and subtype information indicating attributes of arrangement of the plurality of areas included in the input frame, wherein a first shape of each of the plurality of areas corresponds to a second shape of each face of a polyhedron having a plurality of faces for the output frame,
identify the type of the polyhedron for the output frame based on the type information included in the received metadata,
identify the attributes of arrangement of the plurality of areas included in the input frame based on the subtype information included in the received metadata, and
render the output frame by mapping at least one area of the plurality of areas to the faces of the polyhedron respectively, based on the type of the polyhedron identified through the type information and the attributes of arrangement of the plurality of areas identified through the subtype information,
wherein the attributes of arrangement indicate a corresponding relationship between each of the plurality of areas and each of the faces of the polyhedron.

2. The image processing apparatus of claim 1, wherein the plurality of areas included in the input frame are divided based on the second shape of at least one of the faces of the polyhedron and a number of the faces of the polyhedron.

3. The image processing apparatus of claim 2, wherein a number of the plurality of areas is greater than or equal to the number of the faces of the polyhedron.

4. The image processing apparatus of claim 1, wherein the polyhedron is a regular polyhedron.

5. The image processing apparatus of claim 1, wherein the processor is configured to render the output frame by:
identifying positions and directions in which the at least one area of the plurality of areas are mapped to the faces of the polyhedron based on the corresponding relationship between each of the plurality of areas and each of the faces of the polyhedron, and
mapping the at least one area of the plurality of areas to the faces of the polyhedron based on the identified positions and the identified directions.

6. The image processing apparatus of claim 5, wherein the processor is configured to identify the positions and the directions in which the at least one area of the plurality areas are mapped to the faces of the polyhedron based on information on first coordinates indicating a position of each vertex of the polyhedron, information on second coordinates indicating positions of vertices of the at least one area of the plurality of areas, and mesh information indicating a corresponding relationship between the information on the first coordinates and the information on the second coordinates, and wherein the information on the first coordinates, the information on the second coordinates, and the mesh information are included in the corresponding relationship between each of the plurality of areas and each of the faces of the polyhedron.

7. The image processing apparatus of claim 1, wherein the at least one area of the plurality of areas includes a padding area, and wherein the processor is further configured to render a boundary between one of the faces of the polyhedron, which is mapped to the at least one area, and another of the faces adjacent to the one of the faces based on surplus image information of the padding area.

8. The image processing apparatus of claim 1, further comprising a sensor unit configured to sense a user's line of sight, wherein the processor is further configured to:
identify a field of view (FOV) based on a direction of the user's line of sight, and
display an image of an area corresponding to the FOV among the rendered output frame.

9. An image processing method, comprising:
receiving an input frame including a plurality of areas and metadata related to an output frame corresponding to the input frame, the metadata including type information indicating a type of a polyhedron for the output frame and subtype information indicating attributes of arrangement of the plurality of areas included in the input frame, wherein a first shape of each of the plurality of areas corresponds to a second shape of each face of a polyhedron having a plurality of faces for an output frame,
identifying the type of the polyhedron for the output frame based on type information included in metadata included in the received metadata;
identifying the attributes of arrangement of the plurality of areas included in the input frame based on subtype information included in the metadata included in the received metadata; and
rendering the output frame by mapping at least one area of the plurality of areas to the faces of the polyhedron respectively, based on the type of the polyhedron identified through the type information and the attributes of arrangement of the plurality of areas identified through the subtype information,
wherein the attributes of arrangement indicates a corresponding relationship between each of the plurality of areas and each of the faces of the polyhedron.

10. The image processing method of claim 9, wherein the plurality of areas included in the input frame are divided based on the second shape of at least one of the faces of the polyhedron and a number of the faces of the polyhedron.

11. The image processing method of claim 10, wherein a number of the plurality of areas is greater than or equal to the number of the faces of the polyhedron.

12. The image processing method of claim 9, wherein polyhedron is a regular polyhedron.

13. The image processing method of claim 9,
wherein rendering the output frames comprises:
identifying positions and directions in which the at least one area of the plurality of areas are mapped to the faces of the polyhedron based on the corresponding relationship between each of the plurality of areas and each of the faces of the polyhedron; and
mapping the at least one area of the plurality of areas to the faces of the polyhedron based on the identified positions and the identified directions.

14. The image processing method of claim 13, wherein identifying the positions and the directions comprises:
identifying the positions and the directions in which the at least one area of the plurality areas are mapped to the faces of the polyhedron based on information on first coordinates indicating a position of each vertex of the polyhedron, information on second coordinates indicating positions of vertices of the at least one area of the plurality of areas, and mesh information indicating a corresponding relationship between the information on the first coordinates and the information on the second coordinates, and wherein the information on the first coordinates, the information on the second coordinates, and the mesh information are included in the corresponding relationship between each of the plurality of areas and each of the faces of the polyhedron.

15. The image processing method of claim 9, wherein the at least one area of the plurality of areas includes a padding area, and wherein rendering the output frame comprises:
rendering a boundary between one of the faces of the polyhedron, which is mapped to the at least one area, and another of the faces of the polyhedron that is adjacent to the one of the faces, based on surplus image information of the padding area.

16. The image processing method of claim 9, wherein rendering the output frame comprises:
identifying a field of view (FOV) based on a direction of a user's line of sight, and
displaying an image of an area corresponding to the FOV among the rendered output frame.

17. An image processing apparatus, comprising:
a memory configured to store an input frame; and
a processor configured to:
generate metadata related to an output frame corresponding to the input frame, the metadata including type information indicating a type of a polyhedron for the input frame and subtype information indicating attributes of arrangement of the plurality of areas included in the output frame, wherein a first shape of each of a plurality of areas corresponds to a second shape of each face of a polyhedron having a plurality of faces respectively included in the input frame,
identify the type of the polyhedron included in the input frame based on the type information,
identify the attributes of arrangement of the plurality of areas for the output frame based on the subtype information,
generate the output frame by mapping each of the faces of the polyhedron to respectively correspond to the plurality of areas based on the type of the polyhedron and the attributes of arrangement of the plurality of areas, and
store the metadata and the output frame in the storage unit,
wherein the attributes of arrangement indicates a corresponding relationship between each of the plurality of areas and each of the faces of the polyhedron.

18. The image processing apparatus of claim 17, wherein the plurality of areas included in the output frame are divided based on the second shape of at least one of the faces of the polyhedron and a number of the faces of the polyhedron.

19. The image processing apparatus of claim 18, wherein a number of the plurality of areas is greater than or equal to the number of the faces of the polyhedron.

20. The image processing apparatus of claim 17, wherein the polyhedron is a regular polyhedron.

\* \* \* \* \*